United States Patent
Al-Nakhli et al.

(10) Patent No.: US 9,488,042 B2
(45) Date of Patent: Nov. 8, 2016

(54) CHEMICALLY-INDUCED PULSED FRACTURING METHOD

(71) Applicant: Saudi Arabian Oil Company, Dhahran (SA)

(72) Inventors: Ayman R. Al-Nakhli, Dhahran (SA); Hazim H. Abass, Dhahran (SA); Victor V. Hilab, Dhahran (SA); Mirajuddin R. Khan, Dhahran (SA); Ahmad S. Al-Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/689,874

(22) Filed: Apr. 17, 2015

(65) Prior Publication Data

US 2015/0300143 A1 Oct. 22, 2015

Related U.S. Application Data

(60) Provisional application No. 62/017,867, filed on Jun. 27, 2014, provisional application No. 61/980,664, filed on Apr. 17, 2014.

(51) Int. Cl.
*E21B 43/16* (2006.01)
*E21B 43/26* (2006.01)
(Continued)

(52) U.S. Cl.
CPC ............ *E21B 43/26* (2013.01); *C09K 8/52* (2013.01); *C09K 8/62* (2013.01); *C09K 8/665* (2013.01); *C09K 8/80* (2013.01); *E21B 43/267* (2013.01); *C09K 8/592* (2013.01)

(58) Field of Classification Search
CPC ........ E21B 43/16; E21B 43/24; E21B 36/00; C09K 8/58
USPC .............. 166/308.1, 250.1, 259, 271, 308.6
See application file for complete search history.

(56) References Cited

U.S. PATENT DOCUMENTS

| 1,819,055 A | 8/1931 | Jan et al. |
| 1,990,969 A | 2/1935 | Wilson |

(Continued)

FOREIGN PATENT DOCUMENTS

| CN | 101323780 A | 12/2008 |
| CN | 101839123 A | 9/2010 |

(Continued)

OTHER PUBLICATIONS

PCT International Search Report and the Written Opinion; dated Jun. 25, 2015; International Application No. PCT/US2015/026402; International File Date: Apr. 17, 2015.

(Continued)

*Primary Examiner* — Doug Hutton, Jr.
*Assistant Examiner* — Silvana Runyan
(74) *Attorney, Agent, or Firm* — Bracewell LLP; Constance G. Rhebergen; Kevin R. Tamm

(57) ABSTRACT

A method of increasing a stimulated reservoir volume in a wellbore in a gas-containing formation includes the steps of mixing an exothermic reaction component to achieve a pre-selected solution pH, the exothermic reaction component is operable to react at a wellbore temperature to generate a pressure pulse, mixing the exothermic reaction component with a viscous fluid component operable to fracture the gas-containing formation to create fractures, and a proppant component, the proppant component carried to the fractures by the viscous fluid, the proppant component comprises a proppant operable to hold open the fractures, to form a fracturing fluid, injecting the fracturing fluid into the wellbore in the gas-containing formation to create fractures, and generating the pressure pulse when the exothermic reaction component reaches the wellbore temperature, the pressure pulse operable to create auxiliary fractures, wherein the auxiliary fractures create a fracture network, the fracture network increases the stimulated reservoir volume.

26 Claims, 22 Drawing Sheets

(51) Int. Cl.
 *C09K 8/66*    (2006.01)
 *C09K 8/80*    (2006.01)
 *E21B 43/267*   (2006.01)
 *C09K 8/52*    (2006.01)
 *C09K 8/62*    (2006.01)
 *C09K 8/592*    (2006.01)

(56) References Cited

U.S. PATENT DOCUMENTS

| | | |
|---|---|---|
| 2,094,479 A | 9/1937 | Vandergrift |
| 2,288,556 A | 6/1942 | Vollmer |
| 2,466,674 A | 4/1949 | Mullady |
| 2,606,813 A | 8/1952 | Kahr |
| 2,699,213 A | 1/1955 | Cardwell et al. |
| 2,885,004 A | 5/1959 | Perry |
| 3,025,911 A | 3/1962 | Bergman |
| 3,354,954 A | 11/1967 | Buxton |
| 3,385,360 A | 5/1968 | Smith |
| 3,405,761 A | 10/1968 | Parker |
| 3,476,183 A | 11/1969 | Haynes, Jr. et al. |
| 3,483,923 A | 12/1969 | Darley |
| 3,543,856 A | 12/1970 | Knox et al. |
| 3,568,772 A | 3/1971 | Gogarty et al. |
| 3,576,596 A | 4/1971 | Kranc et al. |
| 3,707,192 A | 12/1972 | Goins, Jr. et al. |
| 3,712,380 A | 1/1973 | Caffey |
| 3,719,228 A | 3/1973 | Carcia |
| 3,760,881 A | 9/1973 | Kiel |
| 3,828,854 A | 8/1974 | Templeton et al. |
| 3,864,451 A | 2/1975 | Lee et al. |
| 4,056,146 A | 11/1977 | Hall |
| 4,085,799 A | 4/1978 | Bousaid et al. |
| 4,136,739 A | 1/1979 | Salathiel et al. |
| 4,158,042 A | 6/1979 | Deutschman |
| 4,178,993 A | 12/1979 | Richardson et al. |
| 4,210,628 A | 7/1980 | Ninomiya et al. |
| 4,219,083 A | 8/1980 | Richardson et al. |
| 4,232,740 A | 11/1980 | Park |
| 4,232,741 A | 11/1980 | Richardson et al. |
| 4,291,765 A | 9/1981 | Gilchrist et al. |
| 4,330,037 A | 5/1982 | Richardson et al. |
| 4,399,868 A | 8/1983 | Richardson et al. |
| 4,410,041 A | 10/1983 | Davies et al. |
| 4,414,118 A | 11/1983 | Murphey |
| 4,454,918 A | 6/1984 | Richardson et al. |
| 4,475,595 A | 10/1984 | Watkins et al. |
| 4,482,016 A | 11/1984 | Richardson |
| 4,485,007 A | 11/1984 | Tam et al. |
| 4,491,180 A | 1/1985 | Brown et al. |
| 4,518,040 A | 5/1985 | Middleton |
| 4,572,297 A | 2/1986 | Thigpen, Jr. et al. |
| 4,615,391 A | 10/1986 | Garthoffner |
| 4,703,803 A | 11/1987 | Blumer |
| 4,842,073 A | 6/1989 | Himes et al. |
| 4,846,277 A | 7/1989 | Khalil et al. |
| 4,865,826 A | 9/1989 | Carnell et al. |
| 4,898,750 A | 2/1990 | Friedman et al. |
| 4,919,209 A | 4/1990 | King |
| 5,082,058 A | 1/1992 | Blumer |
| 5,087,350 A | 2/1992 | Paris-Marcano |
| 5,152,906 A | 10/1992 | Aften et al. |
| 5,183,581 A | 2/1993 | Khalil et al. |
| 5,197,544 A | 3/1993 | Himes |
| 5,209,295 A | 5/1993 | Campos et al. |
| 5,342,530 A | 8/1994 | Aften et al. |
| 5,358,565 A | 10/1994 | Shu |
| 5,375,660 A | 12/1994 | Wehunt |
| 5,411,093 A | 5/1995 | Jennings, Jr. |
| 5,411,094 A | 5/1995 | Northrop |
| 5,639,313 A | 6/1997 | Khalil |
| 5,877,127 A * | 3/1999 | Card .................. C08B 37/0096 507/209 |
| 5,958,224 A | 9/1999 | Ho et al. |
| 6,035,933 A | 3/2000 | Khalil et al. |
| 6,277,271 B1 | 8/2001 | Kocal |
| 6,500,219 B1 | 12/2002 | Gunnerman |
| 6,554,071 B1 | 4/2003 | Reddy et al. |
| 6,662,874 B2 | 12/2003 | Surjaatmadja et al. |
| 6,722,434 B2 | 4/2004 | Reddy et al. |
| 6,827,845 B2 | 12/2004 | Gong et al. |
| 6,881,325 B2 | 4/2005 | Morris et al. |
| 6,992,048 B2 | 1/2006 | Reddy et al. |
| 7,029,639 B2 | 4/2006 | Yasutake et al. |
| 7,059,414 B2 | 6/2006 | Rae et al. |
| 7,066,260 B2 * | 6/2006 | Sullivan ................ C09K 8/52 166/280.1 |
| 7,153,434 B1 | 12/2006 | Dennis |
| 7,328,746 B2 | 2/2008 | Al-Taq et al. |
| 7,540,328 B2 | 6/2009 | Brown et al. |
| 7,589,050 B2 | 9/2009 | Frenier et al. |
| 7,624,743 B2 | 12/2009 | Sarkar et al. |
| 7,686,084 B2 | 3/2010 | Reddy et al. |
| 7,779,915 B2 | 8/2010 | Hutchins et al. |
| 7,947,629 B2 | 5/2011 | Fuller |
| 8,096,361 B2 | 1/2012 | Willberg |
| 8,216,344 B2 | 7/2012 | Degenstein et al. |
| 8,282,715 B1 | 10/2012 | Degenstein et al. |
| 8,962,536 B2 | 2/2015 | Winslow et al. |
| 2003/0092581 A1 | 5/2003 | Crews |
| 2003/0221831 A1 | 12/2003 | Reddy et al. |
| 2005/0000694 A1 | 1/2005 | Dalrymple et al. |
| 2005/0215439 A1 | 9/2005 | Blair |
| 2006/0144591 A1 | 7/2006 | Gonzalez et al. |
| 2006/0154814 A1 | 7/2006 | Zanibelli et al. |
| 2008/0066784 A1 | 3/2008 | Sarkar et al. |
| 2008/0121395 A1 | 5/2008 | Reddy |
| 2008/0190607 A1 | 8/2008 | Minnich et al. |
| 2008/0190610 A1 | 8/2008 | Barmatov et al. |
| 2008/0289828 A1 * | 11/2008 | Hutchins .................. C09K 8/68 166/308.3 |
| 2008/0318812 A1 | 12/2008 | Kakadjian, Sr. et al. |
| 2009/0098467 A1 | 4/2009 | Lowe et al. |
| 2010/0056399 A1 | 3/2010 | Berkland et al. |
| 2010/0170453 A1 | 7/2010 | Betzer-Zilevitch |
| 2010/0288499 A1 | 11/2010 | Al-Dhafeeri et al. |
| 2011/0030958 A1 | 2/2011 | Fedorov et al. |
| 2011/0203797 A1 | 8/2011 | Alexandrov et al. |
| 2011/0220360 A1 | 9/2011 | Lindvig et al. |
| 2012/0211225 A1 | 8/2012 | Kostrov et al. |
| 2012/0305255 A1 | 12/2012 | Zavolzhskiy et al. |
| 2013/0123151 A1 | 5/2013 | Crews |
| 2013/0126169 A1 | 5/2013 | Al-Nakhli et al. |
| 2013/0126175 A1 | 5/2013 | Al-Mulhem et al. |
| 2013/0180720 A1 | 7/2013 | Al-Dahlan et al. |
| 2014/0090839 A1 | 4/2014 | Al-Nakhli et al. |
| 2014/0144632 A1 | 5/2014 | Zavolzhski et al. |

FOREIGN PATENT DOCUMENTS

| | | |
|---|---|---|
| EP | 0654582 A1 | 5/1995 |
| EP | 0 909 873 A1 | 4/1999 |
| JP | 2001019984 | 1/2001 |
| JP | 2005015533 A | 1/2005 |
| RU | 2100583 C1 | 12/1997 |
| RU | 2126084 C1 | 2/1999 |
| RU | 2194156 C1 | 12/2002 |
| SU | 1677260 | 9/1991 |
| WO | 0037777 A1 | 6/2000 |
| WO | 2006131895 A1 | 12/2006 |
| WO | 2007015391 | 2/2007 |
| WO | 2008032067 A1 | 3/2008 |
| WO | 2009009370 A1 | 1/2009 |
| WO | 2009070561 A1 | 6/2009 |
| WO | 2010046618 A1 | 4/2010 |
| WO | 2010047612 A1 | 4/2010 |
| WO | 2012012224 A1 | 1/2012 |
| WO | 2012025150 A1 | 3/2012 |

(56) References Cited

FOREIGN PATENT DOCUMENTS

| WO | 2012082402 A2 | 6/2012 |
|---|---|---|
| WO | 2013078306 A1 | 5/2013 |

OTHER PUBLICATIONS

Ashton, J.P., et al., "In-Situ Heat System Stimulates Paraffinic-Crude Producers in Gulf of Mexico," SPE 15660, SPE Production Engineering, May 1989, pp. 157-160, vol. 4, No. 2, Society of Petroleum Engineers.
Database WPI, Week 201115, XP-002693470, Thomson Scientific, London, GB, C:\EPOPROGS\SEA\.\..\.. \epodata\sea\eplogf\internal.log.
Khalil, C.N., et al., "Detection of Formation Damage Associated to Paraffin in Reservoirs of the Reconcavo Baiano, Brazil," SPE 37238, Int'l Symposium on Oilfield Chemistry held in Houston, TX, Feb. 18-21, 1997, Society of Petroleum Engineers, Inc.
Kiryukhin, et al., Thermal-Hydrodynamic Modeling of Laboratory Tests on the Interaction of NaNO3-NaOH Fluids with Sandstone Rock at a Deep Radionuclide Repository Site, pp. 1-20, Russia.
Marques, L.C.C., et al., "A New Technique to Solve Gas Hydrate Problems in Subsea Christmas Trees." SPE 77572, SPE Production & Facilities, Nov. 2004, pp. 253-258, Society of Petroleum Engineers.
PCT International Search Report and the written opinion dated Apr. 8, 2014; International Application No. PCT/US2013/043076; International filed May 29, 2013.
Al-Nakhli, Chemically-Induced Pressure Pulse to Increase Stimulated Reservoir Volume in Unconventional Reservoirs, Unconventional Resources Technology Conference, Denver, CO, Aug. 25-27, 2014.
PCT Notification of Transmittal of the International Search Report and the Written Opinion of the International Searching Authority, or the Declaration; dated Mar. 18, 2013; International Appln No. PCT/US2013/021961; Int'l File Date: Jan. 17, 2013.
PCT Notification of Transmittal of the International Search Report and the Written Opinion of the International Searching Authority, or the Declaration; dated Mar. 5, 2013; International Appln No. PCT/US2012/066249; Int'l File Date: Nov. 21, 2012.
Schlumberger Systems, Sand Control Pumping, pp. 37-70, USA, available at www.slb.com/~/media/files/sand_control/.../scps_03_systems_ashx. Feb. 27, 2012.
European Search Report and Written Opinion issued on Aug. 2, 2013, for related European Patent Application 13174172.
Anning Zhou et al., Deep Desulfurization of Diesel Fuels by Selective Adsorption with Activated Carbons, American Chemical Society, Washington, DC, vol. 49, No. 3, Jul. 1, 2004, pp. 329-332.
Yosuke Sano et al., Selection and Further Activation of Activated Carbons for Removal of Nitrogen Species in Gas Oil as a Pretreatment for its Deep Hydrodesulfurization, Energy & Fuels, vol. 18, Mar. 20, 2004, pp. 644-651.
Cheng Yun-Fu, Preparation and Field Uses of Heat Generating Hydrofracturing Fluids, Oilfield Chemistry Research Institute of Drilling and Production, Dagang Oil Fields, Dagang Oilfield Group Co., Ltd., vol. 14, No. pp. 24-27, Mar. 25, 1997.
PCT International Search Report and Written Opinion dated Apr. 8, 2014, for related PCT application PCT/US2013/043076.
Examination Report issued Jun. 28, 2011 for related European Patent Application No. 08857250.9.
Isao Mochida, "Removal of SOx and NOx over activated carbon fibers," Carbon, vol. 38, 2000 pp. 227-239.
Yosuke Sano, "Adsorptive Removal of Sulfur and Nitrogen Species from a Straight Run Gas Oil Over Activated Carbons for its Deep Hydrodesulfurization," Applied Catalysis B: Environmental 49, 2004, pp. 219-225.
E. Raymundo-Pinero, "Temperature Programmed Desorption Study on the Mechanism of $SO_2$ oxidation by Activated Carbon and Activated Carbon Fibres," Carbon, vol. 39, 2001, pp. 231-242.
N. Shirahama, "Mechanistic Study on Adsorption and Reduction of $NO_2$ Over Activated Carbon Fibers, "Carbon, vol. 40, 2002, pp. 2605-2611.
Isao Mochida, Kinetic Study of the Continuous Removal of SOx on Polyacrylonnitrile-Based Activated Carbon Fibres, Fuel vol. 76, No. 6, 1997, pp. 533-536.
Satoru Murata, "A Novel Oxidative Desulfurization System for Diesel Fuels with Molecular Oxygen in the Presence of Cobalt Catalysts and Aldehydes," Energy & Fuels, vol. 18, No. 1, 2004, pp. 116-121.
Kazaumasa Yazu, "Immobolized Tungstophosphoric Acid-Catalyzed Oxidative Desulfurization of Diesel Oil with Hydrogen Peroxide," Journal of Japan Petroleum Institute, vol. 46, No. 6, 2003, pp. 379-382.
Antonio Chica, "Catalytic Oxidative Desulfurization (ODS) of Diesel Fuel on a Continuous Fixed-Bed Reactor," Journal of Catalysis, vol. 242, 2006, pp. 229-308.
Jeyagowry Sampanthar, "A Novel Oxidative Desulfurization Process to Remove Refractory Sulfur Compounds From Diesel Fuel," Applied Catalysis B: Environmental 63, 2006, pp. 85-93.
Shujiro Otsuki, "Oxidative Desulfurization of Light Gas Oi and Vacuum Gas Oil by Oxidation and Solvent Extraction," Energy & Fuels, vol. 14, No. 6, 2000, pp. 1232-1239.
Kazumasa Yazu, "Oxidative Desulfurization of Diesel Oil with Hydrogen Peroxide in the Presence of Acid Catalyst in Diesel Oil/Acetic Acid Biphase System," Chemistry Letters, vol. 33, No. 10, 2004, pp. 1306-1307.
Paolo DeFilippis, "Oxidative Desulfurization: Oxidation Reactivity of Sulfur Compounds in Different Organic Matrixes," Energy & Fuels, vol. 17, No. 6, 2003, pp. 1452-1455.
Mure Te, "Oxidation Reactivities of Dibenzothiophenes in Polyoxometalate/H202 and Formic Acid/H202 Systems," Applied Catalysis A: General 219, 2001, pp. 267-280.
Isao Mochida, "Adsorption and Adsorbed Species of $SO_2$ during its Oxidative Removal over Pitch-Based Activated Carbon Fibers," Energy & Fuels, vol. 13, No. 2, 1999, pp. 369-373.
Xiang Gao, "Adsorption and Reduction of $NO_2$ Over Activated Carbon at Low Temperature," Fuel Processing Technology 92, 2011,pp. 139-146.
Sano, "Two-step Adsorption Process for Deep Desulfurization of Diesel Oil," Fuel 84 (2005) 903-910.
Related U.S. Appl. No. 14/689,901, filed Apr. 17, 2015, titled "Method for Enhanced Fracture Cleanup Using Redox Treatment".

* cited by examiner

Pre Reaction

Post Reaction

Tight core sample

CT-Scan Image

CHEMICALLY-INDUCED PULSED FRACTURING METHOD

PRIORITY

This application is a non-provisional patent application and claims priority to U.S. Provisional Patent Application No. 62/017,867, filed Jun. 27, 2014, and U.S. Provisional Patent Application No. 61/980,664, filed Apr. 17, 2014, the disclosures of both being hereby incorporated by reference herein in their entirety.

FIELD

This disclosure relates to a composition and method to increase the stimulated reservoir volume in a reservoir formation. More specifically, this disclosure relates to a composition and method to increase the stimulated reservoir volume by increasing the fracture network using an exothermic reaction component.

BACKGROUND

Hydraulic fracturing fluids containing proppants are used extensively to enhance productivity from hydrocarbon reservoir formations, including carbonate and sandstone formations. During hydraulic fracturing operations, a fracturing treatment fluid is pumped under a pressure and rate sufficient for cracking the formation of the reservoir and creating a fracture. Fracturing operations usually consist of three main stages including a pad fluid stage, a proppant fluid stage, and an overflush fluid stage. The pad fluid stage typically consists of pumping a pad fluid into the formation. The pad fluid is a viscous, gelled fluid which initiates and propagates the fractures. The proppant fluid stage involves pumping a proppant fluid into the fractures of the formation. The proppant fluid contains proppants mixed with a viscous, gelled fluid or a visco-elastic surfactant fluid. The proppants in the proppant fluid are lodged in the fractures and create conductive fractures through which hydrocarbons flow. The final stage, the overflush stage, includes pumping a viscous gelled fluid into the fractures to ensure the proppant fluid is pushed inside the fractures. While the three stages have different aims, all three make use of highly viscous and/or gelled fluids to achieve those aims.

A downside of the traditional method is that a high volume of gelled or polymeric materials can be left behind in the fractures. The gelled materials can be concentrated around the proppant in the fractures or can be freely in the fractures. The gelled material acts to block the fractures reducing the fracture conductivity. The hydrocarbons which flow from the reservoir formation are unable to move the gelled materials. Traditional methods for cleaning the fractures involve viscosity breakers or other elements to breakdown the fluid. These traditional methods suffer from an inability to completely cleanup the fractures, leaving residual viscous material and reduced conductivity.

In addition, unconventional gas wells require an extensive fracturing network to increase the stimulated reservoir volume and to create commercially producing wells. One commonly employed technique is multi-stage hydraulic fracturing in horizontal wells, which is very costly and may not provide the required stimulated reservoir volume. Moreover, traditional hydraulic fracturing methods use huge amounts of damaging gels pumped downhole as noted above. Even with traditional breakers, significant amount of polymeric material cannot be recovered and, therefore, fracture conductivity is reduced.

Therefore, a method that increases the stimulated reservoir volume of unconventional gas wells is desired. A method that minimizes the volume of fracturing fluid required, while increasing the volume of fluid recovered regardless of the type of reservoir or well is also desired.

SUMMARY

This disclosure relates to a composition and method to increase the stimulated reservoir volume in a reservoir formation. More specifically, this disclosure relates to a composition and method to increase the stimulated reservoir volume by increasing the fracture network using an exothermic reaction component.

In a first aspect, a method of increasing a stimulated reservoir volume in a wellbore in a gas-containing formation is provided. The method includes the steps of mixing an exothermic reaction component to achieve a pre-selected solution pH, wherein the exothermic reaction component is operable to react at a wellbore temperature to generate a pressure pulse, mixing the exothermic reaction component with a viscous fluid component, the viscous fluid component operable to fracture the gas-containing formation to create fractures, and a proppant component, the proppant component carried to the fractures by the viscous fluid, the proppant component includes a proppant, the proppant operable to hold open the fractures, to form a fracturing fluid, injecting the fracturing fluid into the wellbore in the gas-containing formation to create fractures, and generating the pressure pulse when the exothermic reaction component reaches the wellbore temperature, the pressure pulse operable to create auxiliary fractures, wherein the auxiliary fractures create a fracture network, wherein the fracture network increases the stimulated reservoir volume. Fracturing fluid is used in a primary operation to create fractures. The auxiliary fractures extend from the fractures caused by the fracturing fluid to create a fracture network. The auxiliary fractures can be caused by the reaction of the exothermic reaction component.

In certain aspects of the present disclosure, the exothermic reaction component includes an ammonium containing compound and a nitrite containing compound. In certain aspects of the present disclosure, the ammonium containing compound is $NH_4Cl$ and the nitrite containing compound is $NaNO_2$. In certain aspects, the pre-selected solution pH is between 6.5 and 9. In certain aspects of the present disclosure, the wellbore temperature is in a range between 48.8° C. (120° F.) and 121.1° C. (250° F.). In certain aspects, the pressure pulse is between 500 psi and 50,000 psi.

In a second aspect, a method of increasing a stimulated reservoir volume in a wellbore in a gas-containing formation is provided. The method includes the steps of mixing an exothermic reaction component to achieve a pre-selected solution pH, wherein the exothermic reaction component is operable to react at a wellbore temperature to generate a pressure pulse, injecting the exothermic reaction component in the gas-containing formation to create fractures, and generating the pressure pulse when the exothermic reaction component reaches the wellbore temperature, the pressure pulse operable to create auxiliary fractures, wherein the auxiliary fractures connect to the fractures to create a fracture network, wherein the fracture network increases the stimulated reservoir volume.

In certain aspects of the present disclosure, the exothermic reaction component includes an ammonium containing compound and a nitrite containing compound. In certain aspects of the present disclosure, the ammonium containing compound is $NH_4Cl$ and the nitrite containing compound is $NaNO_2$. In certain aspects, the pre-selected solution pH is between 6.5 and 9. In certain aspects, the wellbore temperature is in a range between 48.8° C. (120° F.) and 121.1° C. (250° F.). In certain aspects of the present disclosure, the pressure pulse is between 500 psi and 50,000 psi.

In some embodiments, a method of increasing a stimulated reservoir volume in a wellbore in a gas-containing formation is disclosed. The method comprises the steps of mixing an exothermic reaction component in an aqueous solution to achieve a pre-selected solution pH, wherein the exothermic reaction component is operable to react at a pre-selected wellbore temperature to generate a pressure pulse, and mixing the aqueous solution with a viscous fluid component to form a fracturing fluid, the viscous fluid component operable to fracture the gas-containing formation to create fractures, and the fracturing fluid further comprising a proppant component, the proppant component carried to the fractures by the viscous fluid component, the proppant component comprises a proppant, the proppant operable to hold open the fractures. The method further comprises the steps of injecting the fracturing fluid into the wellbore in the gas-containing formation to create fractures, and generating the pressure pulse when the exothermic reaction component reaches the pre-selected wellbore temperature, such that the pressure pulse is operable to create auxiliary fractures, wherein the auxiliary fractures create a fracture network, wherein the fracture network increases the stimulated reservoir volume.

In some embodiments, the exothermic reaction component comprises an ammonium containing compound and a nitrite containing compound. In other embodiments, the ammonium containing compound comprises $NH_4Cl$ and the nitrite containing compound comprises $NaNO_2$. In other embodiments, the pre-selected solution pH is between 5.7 and 9. Still in other embodiments, the wellbore temperature is in a range between 48.8° C. (120° F.) and 121.1° C. (250° F.). In yet other embodiments, the pressure pulse is between 500 psi and 50,000 psi. In some embodiments, the pressure pulse creates the auxiliary fractures in less than 10 seconds. Still in other embodiments, the pressure pulse creates the auxiliary fractures in less than 5 seconds.

Disclosed herein is a method of increasing a stimulated reservoir volume in a wellbore in a gas-containing formation, the method comprising the steps of mixing an exothermic reaction component in an aqueous solution to achieve a pre-selected solution pH, wherein the exothermic reaction component is operable to react at a pre-selected wellbore temperature to generate a pressure pulse and injecting the exothermic reaction component in the gas-containing formation to create fractures. The method further comprises the step of generating the pressure pulse when the exothermic reaction component reaches the pre-selected wellbore temperature, such that the pressure pulse is operable to create auxiliary fractures, wherein the auxiliary fractures connect to the fractures to create a fracture network, wherein the fracture network increases the stimulated reservoir volume.

In some embodiments, the exothermic reaction component comprises an ammonium containing compound and a nitrite containing compound. In other embodiments, the ammonium containing compound comprises $NH_4Cl$ and the nitrite containing compound comprises $NaNO_2$. Still in other embodiments, the pre-selected solution pH is between 5.7 and 9. In yet other embodiments, the wellbore temperature is in a range between 48.8° C. (120° F.) and 121.1° C. (250° F.). Still in other embodiments, the pressure pulse is between 500 psi and 50,000 psi. In certain aspects, the pressure pulse creates the auxiliary fractures in less than 10 seconds. In other aspects, the pressure pulse creates the auxiliary fractures in less than 5 seconds.

Disclosed herein is a method for hydraulic fracturing of a hydrocarbon-bearing formation, the method comprising the steps of determining a wellbore temperature at a depth within the hydrocarbon-bearing formation, and determining a length of time for which a hydraulic fracturing fluid needs to reach the depth within the hydrocarbon-bearing formation and reach the wellbore temperature at the depth. The method further comprises the steps of mixing an exothermic reaction component in an aqueous solution to achieve a pre-selected solution pH, wherein the exothermic reaction component is operable to react at the wellbore temperature at the depth within the hydrocarbon-bearing formation to generate a pressure pulse, and mixing the aqueous solution with a viscous fluid component to form the hydraulic fracturing fluid, the viscous fluid component operable to fracture the gas-containing formation to create fractures, and the fracturing fluid further comprising a proppant component, the proppant component carried to the fractures by the viscous fluid component, the proppant component comprises a proppant, the proppant operable to hold open the fractures.

The method further comprises the steps of injecting the fracturing fluid into the wellbore in the gas-containing formation to create fractures, and generating the pressure pulse when the exothermic reaction component reaches the wellbore temperature, such that the pressure pulse is operable to create auxiliary fractures, wherein the auxiliary fractures create a fracture network, wherein the fracture network increases the stimulated reservoir volume. In some embodiments, the exothermic reaction component comprises an ammonium containing compound and a nitrite containing compound In some embodiments, the ammonium containing compound comprises $NH_4Cl$ and the nitrite containing compound comprises $NaNO_2$. Still in other embodiments, the pre-selected solution pH is between 5.7 and 9. In still other embodiments, the wellbore temperature is in a range between 48.8° C. (120° F.) and 121.1° C. (250° F.).

In certain aspects, the pressure pulse is between 500 psi and 50,000 psi. In some embodiments, the pressure pulse creates the auxiliary fractures in less than 10 seconds. Still in other embodiments, the pressure pulse creates the auxiliary fractures in less than 5 seconds.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

DETAILED DESCRIPTION

Figure 1:
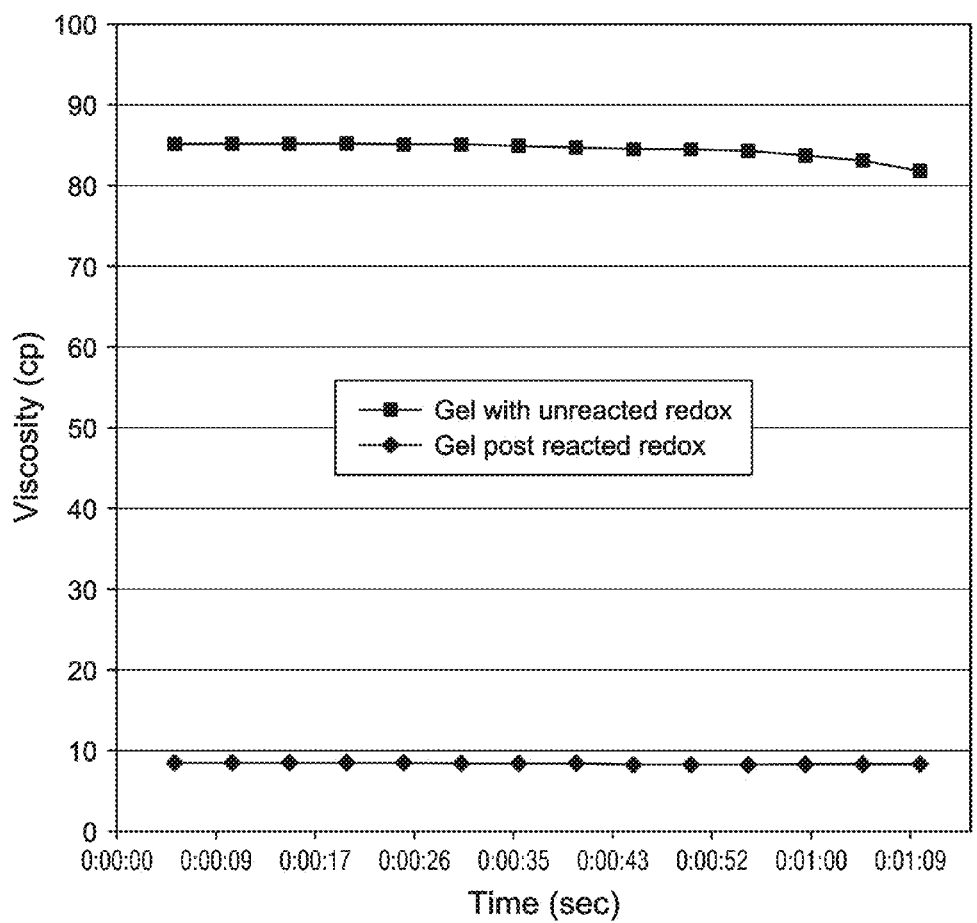
FIG. 1 is a graphic representation of the effect of the cleanup fluid on the viscosity of the residual viscous material.

While the disclosure will be described with several embodiments, it is understood that one of ordinary skill in the relevant art will appreciate that many examples, variations and alterations to the apparatus and methods described herein are within the scope and spirit of the disclosure. Accordingly, the embodiments of the disclosure described herein are set forth without any loss of generality, and without imposing limitations, on the claims.

In one aspect, a method for improved hydrocarbon recovery from a formation due to cleanup of a residual viscous material is provided. The hydraulic fracturing operation fractures the formation using fracturing fluid to create fractures. Formations include sandstone and carbonate, for example.

The fracturing fluid includes the viscous fluid component and the proppant component. The viscous fluid component has a viscosity. The viscous fluid component is operable to increase the viscosity of the fracturing fluid. Viscous fluid components include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose. Guar-based fluids include hydroxypropyl guar, carboxymethyl guar, guar cross-linked boron ions from an aqueous borax/boric acid solution and guar cross-linked with organometallic compounds. Organometallic compounds include zirconium, chromium, antimony, and titanium salts. Gel oil-based fluids include aluminum phosphate-ester oil gels. In at least one embodiment, the viscous fluid component is an aqueous guar solution, having a concentration of guar gum between about 0.1% and about 15%, between about 0.1% and about 10%, between about 1% and about 10%, between about 2% and about 8%, and between about 4% and about 6%.

The proppant component includes a proppant. The proppants in the proppant fluid are lodged in the fractures and create conductive fractures through which hydrocarbons flow. Any proppants capable of holding open conductive fractures are suitable for use in the present embodiments. In some embodiments, the proppant component includes a viscous carrier fluid having a viscosity. Viscous carrier fluids include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose. Guar-based fluids include hydroxypropyl guar, carboxymethyl guar, guar cross-linked boron ions from an aqueous borax/boric acid solution, and guar cross-linked with organometallic compounds. Organometallic compounds include zirconium, chromium, antimony, and titanium salts. Gel oil-based fluids include aluminum phosphate-ester oil gels.

In some embodiments, the hydraulic fracturing operation uses a one stage fracturing fluid, in which the fracturing fluid includes both the viscous fluid component and the proppant component, in which the viscous fluid component carries the proppant component to the fractures. In at least one embodiment of the present disclosure, the hydraulic fracturing operation uses a multi-stage fracturing fluid in which the viscous fluid component is injected into the formation, followed by the proppant component in the viscous carrier fluid. In some embodiments, the injection of the proppant component is followed by injection of additional viscous fluids to ensure the proppants are placed in the fractures. The additional viscous fluids have a viscosity. In some embodiments, the viscosity of the viscous fluid component, the viscous carrier fluid, and additional viscous fluids are the same. In some embodiments, the viscosity of the viscous fluid component, the viscous carrier fluid, and additional viscous fluids are different. The injection of the fracturing fluid ceases after the proppants are placed in the fractures and the fracturing fluid is allowed to seep from the fractures.

The hydraulic fracturing operation leaves residual viscous material in the fractures. Residual viscous materials include carboxymethyl cellulose, hydroxyethyl cellulose, carboxymethyl hydroxyethyl cellulose, hydroxypropyl cellulose, and methyl hydroxyl ethyl cellulose, guar gum, hydroxypropyl guar, carboxymethyl guar, guar cross-linked with boron, aluminum phosphate-ester oil gel, and guar cross-linked with organometallic compounds. Organometallic compounds include zirconium, chromium, antimony, and titanium salts. In some embodiments of the present disclosure, the residual viscous material is a gelled material. In some embodiments, the residual viscous material is a polymeric material. In at least one embodiment, the residual viscous material is guar gum. The residual viscous material has a viscosity greater than the fracturing fluid. In at least one embodiment, the residual viscous material is surrounding and/or adjacent to the proppants placed in the fractures.

The cleanup fluid acts, after the proppants have been placed in the fractures, to remove the residual viscous material. In one embodiment of the present disclosure, the cleanup fluid is mixed with the fracturing fluid. In at least one embodiment, where a multi-stage fracturing fluid is used, the cleanup fluid is a component of the fluids used at each stage of the hydraulic fracturing operation. In an alternate embodiment, the cleanup fluid is added only to the fluid of the final stage of the hydraulic fracturing operation. In some embodiments, the cleanup fluid is pumped to the fractured formation as a separate step following the hydraulic fracturing operation.

The cleanup fluid includes an acid precursor and an exothermic reaction component. The reaction of the exothermic reaction component results in a release of kinetic energy and thermal energy. The reaction of the exothermic reaction component generates heat and increases the pressure. The generated heat increases the temperature of the surrounding fluids, including fracturing fluid remaining in the fractures and residual viscous material. The increase in temperature reduces the viscosity of the fracturing fluid. The increase in temperature reduces the viscosity of the residual viscous material left in the fractures to create a reduced viscosity material. The reduced viscosity material flows from the fractures of the formation to the wellbore. The increase in pressure provides lift energy to push the reduced viscosity materials through the wellbore toward the surface. The removal of the residual viscous material increases the conductivity of the fractures. Increased conductivity of the fractures increases seepage of the fracturing fluid, improves fracturing efficiency, minimizes need for additional fracturing jobs, minimizes time between fracturing and well production, and increases hydrocarbon flow, which translates to increased hydrocarbon recovery.

The acid precursor is any acid that releases hydrogen ions to trigger the reaction of the exothermic reaction component. Acid precursors include triacetin (1,2,3-triacetoxypropane), methyl acetate, HCl, and acetic acid. In at least one embodiment, the acid precursor is triacetin. In at least one embodiment of the present disclosure, the acid precursor is acetic acid.

The exothermic reaction component includes one or more redox reactants that exothermically react to produce heat and increase pressure. Exothermic reaction components include urea, sodium hypochlorite, ammonium containing compounds, and nitrite containing compounds. In at least one embodiment, the exothermic reaction component includes ammonium containing compounds. Ammonium containing compounds include ammonium chloride, ammonium bromide, ammonium nitrate, ammonium sulfate, ammonium carbonate, and ammonium hydroxide. In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In at least one embodiment, the exothermic reaction component includes two redox reactants: $NH_4Cl$ and $NaNO_2$, which react according to the following:

$$NH_4Cl + NaNO_2 \xrightarrow{(H^+ \text{ or } \Delta H)} N_2 + NaCl + 2H_2O + \text{Heat}$$

In a reaction of the exothermic reaction components according to the above equation, generated gas contributes to the reduction of the viscosity of the residual viscous material.

The exothermic reaction component is triggered to react. In at least one embodiment, the exothermic reaction component is triggered within the fractures. In at least one embodiment of the present disclosure, the acid precursor triggers the exothermic reaction component to react by releasing hydrogen ions.

In at least one embodiment, the exothermic reaction component is triggered by heat. The wellbore temperature is reduced during a pre-pad injection or a pre-flush with brine and reaches a temperature below 120° F. (48.9° C.). The fracturing fluid of the present disclosure is then injected into the well and the wellbore temperature increases. When the wellbore temperatures reaches a temperature greater than or equal to 120° F., the reaction of the redox reactants is triggered. In at least one embodiment of the present disclosure, the reaction of the redox reactants is triggered by temperature in the absence of the acid precursor. In at least one embodiment of the present disclosure, the exothermic reaction component is triggered by heat when the exothermic reaction component is within the fractures.

In at least one embodiment, the exothermic reaction component is triggered by pH. A base is added to the fracturing fluid of the present disclosure to adjust the pH to between 9 and 12. In at least one embodiment the base is potassium hydroxide. The fracturing fluid with the base is injected into the formation. Following the injection of the fracturing fluid an acid is injected to adjust the pH to below 6. When the pH is below 6, the reaction of the redox reactants is triggered. In at least one embodiment of the present disclosure, the exothermic reaction component is triggered by pH when the exothermic reaction component is within the fractures.

In at least one embodiment, the cleanup fluid is introduced to the fractures following the hydraulic fracturing operation. Dual-string coiled tubing is used to introduce the exothermic reaction component and the acid precursor to the wellbore. In at least one embodiment, the exothermic reaction component includes $NH_4Cl$ and $NaNO_2$. The acid precursor is acetic acid. The acetic acid is mixed with $NH_4Cl$ and is injected in parallel with the $NaNO_2$, using different sides of the dual-string coiled tubing. The exothermic reaction component and the acid precursor mix within the fractures.

In an alternate embodiment of the present disclosure, a method to increase a stimulated reservoir volume in a gas-containing formation is provided. The gas-containing formation can include a tight gas formation, an unconventional gas formation, and a shale gas formation. Formations include Indiana limestone, Beria sandstone, and shale. The stimulated reservoir volume is the volume surrounding a wellbore in a reservoir that has been fractured to increase well production. Stimulated reservoir volume is a concept useful to describe the volume of a fracture network. The method to increase a stimulated reservoir volume can be performed regardless of the reservoir pressure in the gas-containing formation. The method to increase a stimulated reservoir volume can be performed in a gas-containing formation having a reservoir pressure in a range of atmospheric pressure to 10,000 psig.

In the method of the present disclosure, the exothermic reaction component is mixed to achieve a pre-selected solution pH. The pre-selected solution pH is in a range of about 6 to about 9.5, alternately about 6.5 to about 9. In at least one embodiment, the pre-selected solution pH is 6.5. The exothermic reaction component is mixed with the viscous fluid component and the proppant component to form the fracturing fluid. The fracturing fluid is injected into the wellbore in the gas-containing formation to create fractures and the proppant(s) holds open the fractures. The exothermic reaction component reacts and upon reaction generates a pressure pulse that creates auxiliary fractures. Fracturing fluid is used in a primary operation to create fractures. The auxiliary fractures extend from the fractures caused by the fracturing fluid to create a fracture network. The fracture network increases the stimulated reservoir volume. In some embodiments, the injection of the hydraulic fracturing fluid including the viscous fluid component and/or the proppant component and/or the overflush component and/or the exothermic reaction component does not generate foam or introduce foam into the hydraulic formation including the hydraulic fractures.

In at least one embodiment, the exothermic reaction component reacts when the exothermic reaction component reaches the wellbore temperature. The wellbore temperature is between about 100° F. and about 250° F., alternately between about 120° F. and about 250° F., alternately between about 120° F. and about 230° F., alternately between about 140° F. and about 210° F., alternately about 160° F. and about 190° F. In at least one embodiment, the wellbore temperature is 200° F. In at least one embodiment, the wellbore temperature at which the exothermic reaction component reacts is affected by the pre-selected solution pH and an initial pressure. The initial pressure is the pressure of the exothermic reaction component just prior to the reaction of the exothermic reaction component. Increased initial pressure can increase the wellbore temperature that triggers the reaction of the exothermic reaction component. Increased pre-selected solution pH can also increase the wellbore temperature that triggers the reaction of the exothermic reaction component.

When the exothermic reaction component reacts, the reaction generates a pressure pulse and heat. The pressure pulse is generated within milliseconds from the start of the reaction. The pressure pulse is at a pressure between about 500 psi and about 50,000 psi, alternately between about 500 psi and about 20,000 psi, alternately between about 500 psi and about 15,000 psi, alternately between about 1,000 psi and about 10,000 psi, alternately between about 1,000 psi and about 5,000 psi, and alternately between about 5,000 psi and about 10,000 psi.

The pressure pulse creates auxiliary fractures. The auxiliary fractures extend from the point of reaction in all directions without causing damage to the wellbore or the fractures created due to the step of injecting the fracturing fluid. The pressure pulse creates the auxiliary fractures regardless of the reservoir pressure. The pressure of the pressure pulse is affected by the initial reservoir pressure, the concentration of the exothermic reaction component, and the solution volume. In addition to the pressure pulse, the reaction of the exothermic reaction component releases heat. The heat released by the reaction causes a sharp increase in the temperature of the formation, which causes thermal fracturing. Thus, the heat released by the exothermic reaction component contributes to the creation of the auxiliary fractures. The exothermic reaction component allows for a high degree of customization to meet the demands of the formation and fracturing conditions.

In at least one embodiment, the acid precursor can be used to trigger the exothermic reaction component to react. In at least one embodiment, the exothermic reaction component is injected into the wellbore in the absence of the viscous fluid component and the proppant component and allowed to react to generate the pressure pulse.

In at least one embodiment, the method to increase a stimulated reservoir volume also performs the method to cleanup a residual viscous material as described herein. The method of the present disclosure can be adjusted to meet the needs of the fracturing operation. In one embodiment, the fracturing fluid includes an exothermic reaction component that reacts to both create auxiliary fractures and to cleanup residual viscous material from the fracturing fluid. In one embodiment of the present disclosure, the fracturing fluid includes an exothermic reaction component that reacts to only create auxiliary fractures. In one embodiment, the fracturing fluid includes an exothermic reaction component that reacts to only cleanup residual viscous material.

A method to increase the stimulated reservoir volume of a gas-containing formation is described herein. The method to increase a stimulated reservoir volume can be performed in oil-containing formations, water-containing formations, or any other formation. In at least one embodiment of the present disclosure, the method to increase a stimulated reservoir volume can be performed to create fractures and auxiliary fractures in cement.

EXAMPLES

Example 1

Figure 3A:
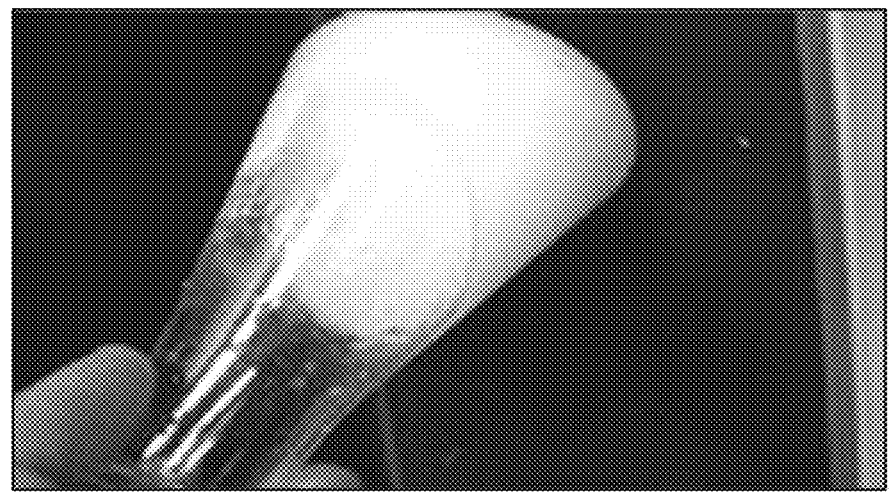
FIGS. 3a and 3b are pictorial representation of the residual viscous material before and after the reaction of an exothermic reaction component of the cleanup fluid.
Figure 3B:
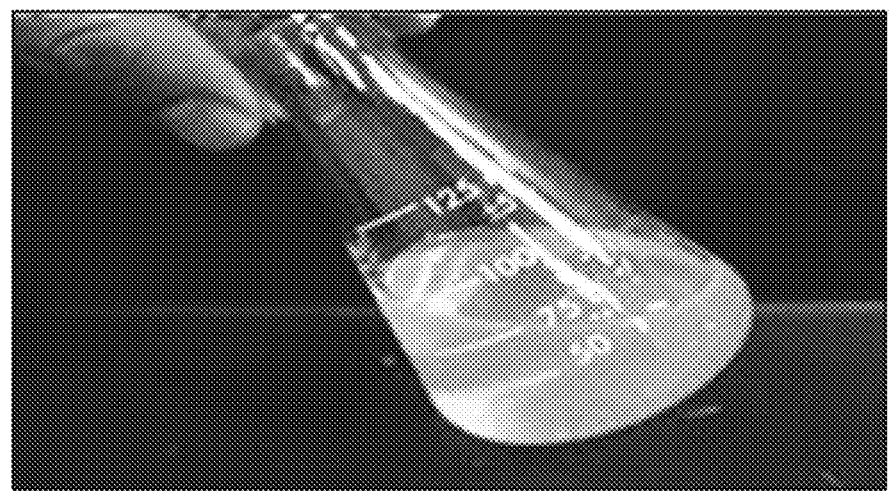

An exothermic reaction component of a cleanup fluid consisting of 3M $NH_4Cl$ and 3M $NaNO_2$ was added to a solution of 1% by volume guar at room temperature, see FIG. 3. The exothermic reaction component was triggered by heat. The viscosity of the solution was measured before, during, and after the reaction using a Chandler viscometer. Prior to reaction of the exothermic reaction component, the viscosity of the residual viscous material was 85 cP. FIG. 1 is a graph of the viscosity following the reaction of the exothermic reaction component. The graph shows that the viscosity of the residual viscous material was reduced to less than 8.5 cP. FIG. 3$b$ shows the solution, including the residual viscous material after the reaction of the exothermic reaction component.

Example 2

An aqueous solution of an exothermic reaction component was prepared from 3M $NH_4Cl$ and 3M $NaNO_2$. The aqueous solution was placed in an autoclave reactor at room temperature and an initial pressure of 1,000 psi. The reaction temperature was increased. The reaction was triggered at about 120° F., see FIG. 2. Due to the reaction, the temperature in the reactor reached a temperature of 545° F. and a pressure of 3,378 psi, see FIG. 2.

Example 3

In Example 3, two autoclave reactors, were used to study the reaction kinetics of the exothermic reaction component. One autoclave reactor was rated up to 10,000 psi and 500° C. with a total volume of 3 L. The other autoclave reactor was rated up to 20,000 psi and 500° C. with a total volume of 80 ml. The experimental parameters were monitored and controlled remotely by computer. Real time pressure and temperature data were recorded every 2 seconds in an effort to capture the resultant pressure-temperature behavior during the reaction of the exothermic reaction component. The set-up simulated the pressure and temperature that would occur in a wellbore as a result of injecting the exothermic reaction component in the wellbore and triggering the reaction. The study assumed that the wellbore was drilled in a zero permeability formation to match that of the autoclave reactor. Such an assumption can be considered an approximation of a shale formation, even though a shale formation will have some permeability. The study allowed three independent variables to be tested: molarity of the exothermic reaction component, initial pressure inside the autoclave reactor, and ratio of the volume of the exothermic reaction component to the volume of the autoclave reactor.

Example 4

In Example 4, rock sample tests were conducted to test the fracturing potential of the method of the present disclosure. The rock samples created for use in Example 4 were rectangular blocks with dimensions of 8"×8"×8" and 10"×10"×10". The rock samples were created from Indiana limestone, Beria sandstone, shale, and cement. The limestone, sandstone, and shale blocks were taken from outcrop samples. The cement rock sample was cast from mixing water and cement at a weight ratio of water to cement of 31:100. Table 1 shows the physical and mechanical properties for the rock samples.

TABLE 1

Properties of Rock Samples for Tests 1 through 4

| Property | Test #1 | Test #2 | Test #3 | Test #4 |
|---|---|---|---|---|
| Sample Material | White Cement | Portrait Cement | Indiana Limestone | Shale |
| Dimension | 8 × 8 × 8" | 8 × 8 × 8" | 10 × 10 × 10" | 10 × 10 × 10" |
| Porosity | 29% | 24.2% | 28% | 3.8% |
| Bulk Density, gm/cc | 1.82 | 2.01 | 1.82 | 2.50 |
| Young's Modulus, psi | $1.92 \times 10^6$ | $2.1 \times 10^6$ | $1.92 \times 10^6$ | $2.66 \times 10^6$ |
| Poisson's ratio | 0.26 | 0.19 | 0.26 | 0.20 |
| Uniaxial compressive strength, psi | 3,299 | 3,147 | 3,229 | 4,965 |
| Cohesive strength, psi | 988 | 1,317 | 1,067 | 1,268 |
| Tensile strength, psi | Not Available | Not Available | 271 | Not Available |
| Internal friction angle | 28° | 10.1° | 23° | 36° |

Figure 2:
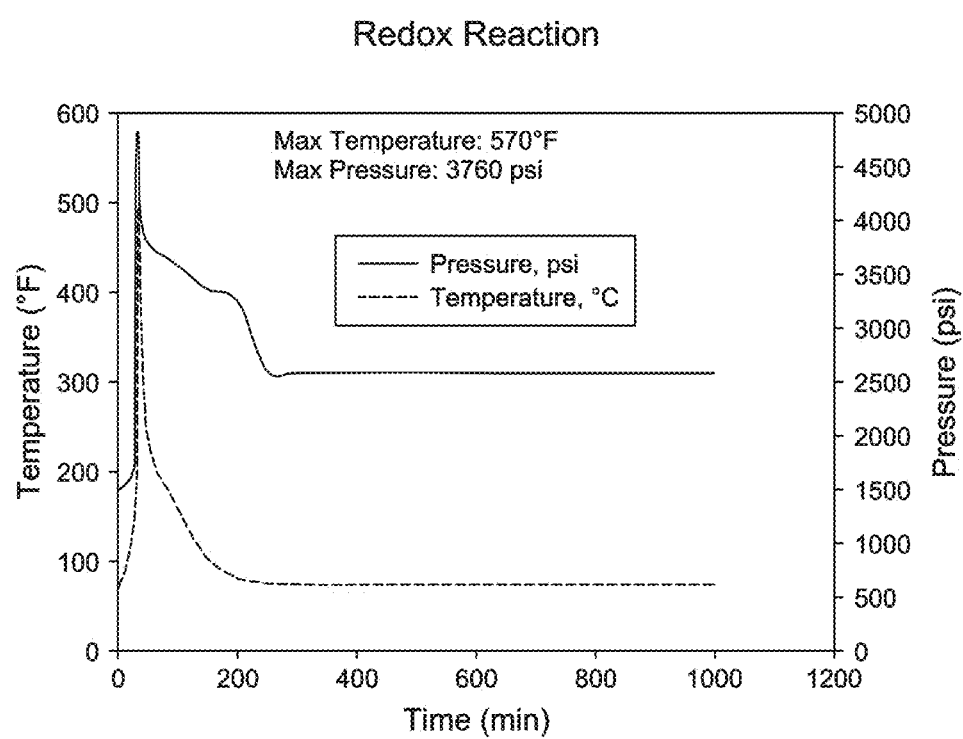
FIG. 2 is a graphic representation of the heat and pressure generated by the exothermic reaction component.
Figure 4:
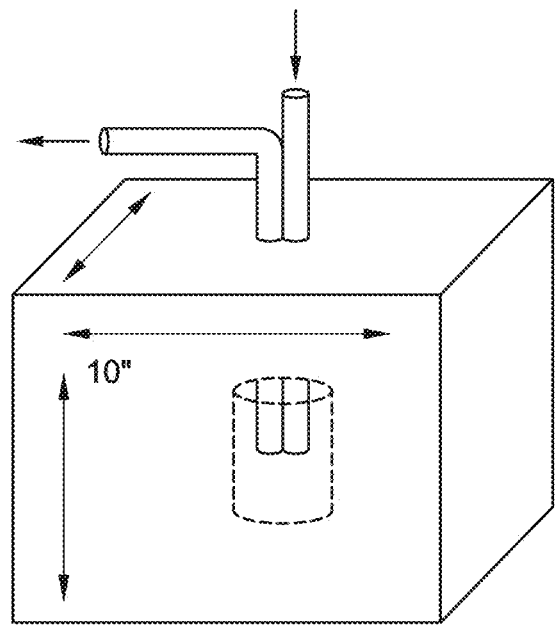
FIG. 4 is a graphic representation of the block design of the rock samples for the unconfined tests described herein.
Figure 5:
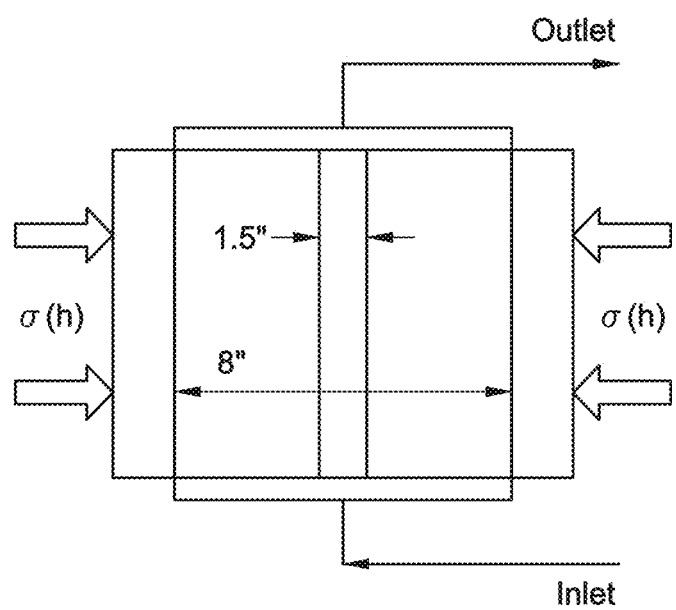
FIG. 5 is a graphic representation of the block design of the rock samples for the confined tests described herein.

Each rock sample had a simulated wellbore drilled in the center of the rock sample measuring 1.5×3", as shown in FIG. 4 and FIG. 5. For the unconfined tests, the vertical openhole wellbore was 3" long and 1.5" in diameter, as shown in FIG. 2. For the confined test, the vertical openhole wellbore was 1.5" diameter cast all the way through the center of the block, as shown in FIG. 3. Samples of the exothermic reaction component were mixed with the viscous fluid component to create sample fracturing fluids with a loading of 40 lbs/Mgal. The viscosity of the fracturing fluid was about 1,600 cP at a shear rate of 81 $s^{-1}$, at room temperature. The concentration of the exothermic chemical component was 3M and was used immediately after preparation. During the tests, the injection rate of the fracturing fluid into the vertical openhole wellbore was 30 cc/min.

The samples of the fracturing fluid were tested with and without confinement. For the confined stress testing, samples were loaded in a biaxial cell with equal horizontal stresses of 2000 psi for one test, and 4000 psi for another test. Approximating a depth of 2570 feet, these stresses represent gradients of 0.78 psi/ft, and 1.56 psi/ft, respectively. The fracturing fluid samples with the exothermic reaction component included were injected in the blocks and heat was applied using the biaxial plates.

Tests 1 Through 4. Unconfined Testing Conditions
Tests 1 and 2.

Figure 6:
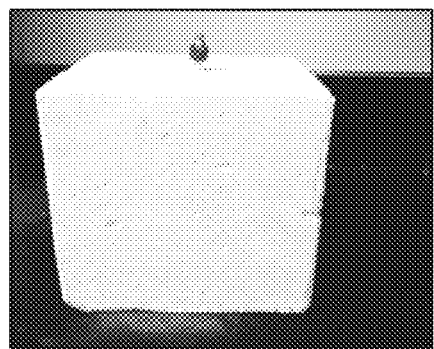
FIG. 6 is a pictorial representation of pre and post treatment of the white cement rock sample using the method of the present disclosure.
Figure 6:
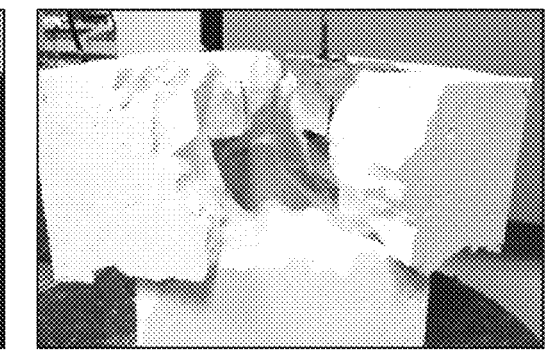
Figure 7:
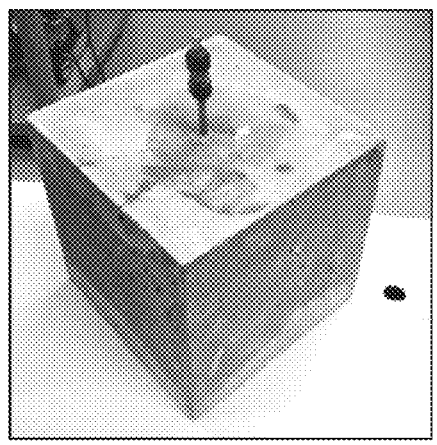
FIG. 7 is a pictorial representation of pre and post treatment of the portrait cement rock sample using the method of the present disclosure.
Figure 7:

For tests 1 and 2, the rock samples were man-made cement blocks. The rock samples were preheated to 200° F. Then, the exothermic reaction component was injected in the rock samples at atmospheric pressure at a rate of 30 cc/min. As the injection neared completion and the reaction took place, multiple fractures were created, as shown in FIGS. 6 and 7. The fractures were longitudinal and perpendicular with respect to the vertical openhole wellbore. The fracture geometry indicated that fractures propagated from the wellbore to the sides of the sample, indicating that the pressure generated was greater than compressive strength of the samples. The breakdown pressure for the rock samples of test 1 and test 2 was 5,400 psi.

Test 3.

Figure 8:
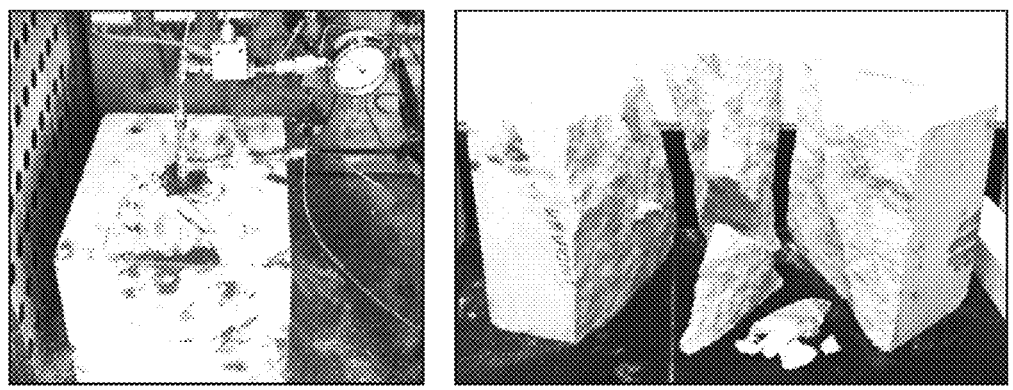
FIG. 8 is a pictorial representation of pre and post treatment of the Indiana limestone rock sample using the method of the present disclosure.

For test 3, an Indiana limestone block sample was tested. The block was preheated to 200° F. Then, the exothermic reaction component was injected in the rock sample at atmospheric pressure at a rate of 15 cc/min. As injection neared completion and the reaction took place, fractures were created within two minutes as shown in FIG. 8. There were two longitudinal fractures and one perpendicular fracture with respect to the vertical openhole wellbore. The breakdown pressure for test 3 was 4,700 psi.

Test 4.

Figure 9:
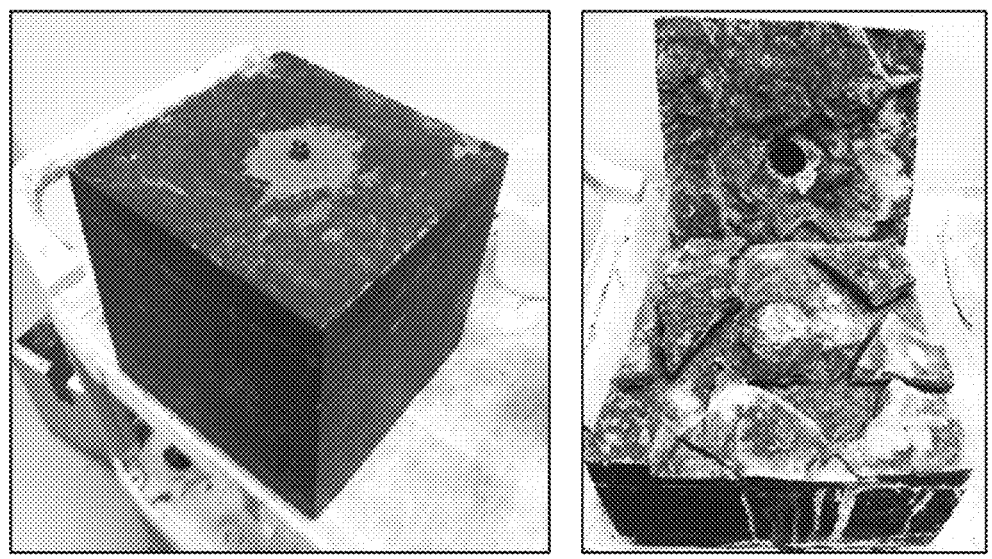
FIG. 9 is a pictorial representation of pre and post treatment of the Shale rock sample using the method of the present disclosure.

In test 4, the test block was a Shale block sample with a drilled vertical openhole wellbore 2" long and 1.5" in diameter, to simulate a vertical well. In this test, the exothermic reaction component was injected first. Then the block was placed in a 200° F. oven. After 3 hours, the exothermic reaction component was triggered and the chemical reaction took place and fractures were created, as shown in FIG. 9. The time interval for the reaction to be activated simulated downhole-temperature recovery of the wellbore. The breakdown pressure for test 4 was 6,600 psi.

Tests 5 and 6. Confined Condition Testing

Figure 10:
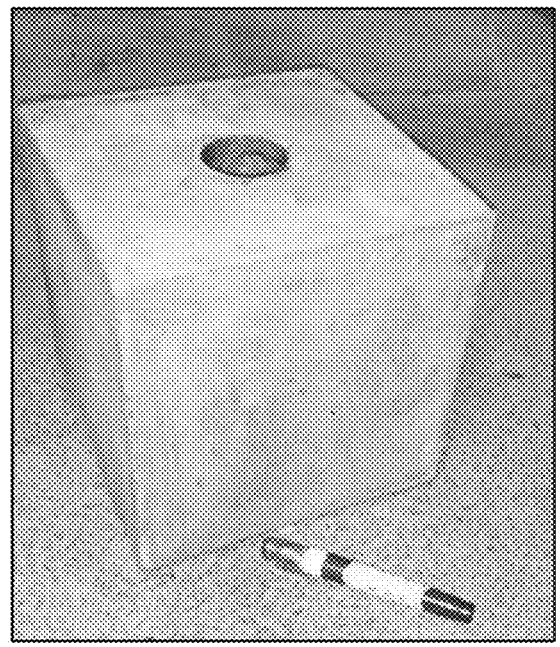
FIG. 10 is a pictorial representation of a cement rock sample for use in a confined test.
Figure 12:
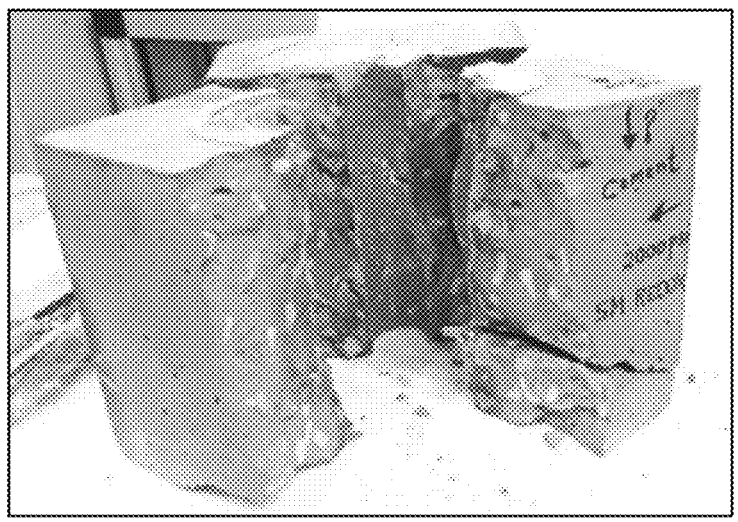
FIG. 12 is a pictorial representation of the cement rock sample after confined test #5.
Figure 11:
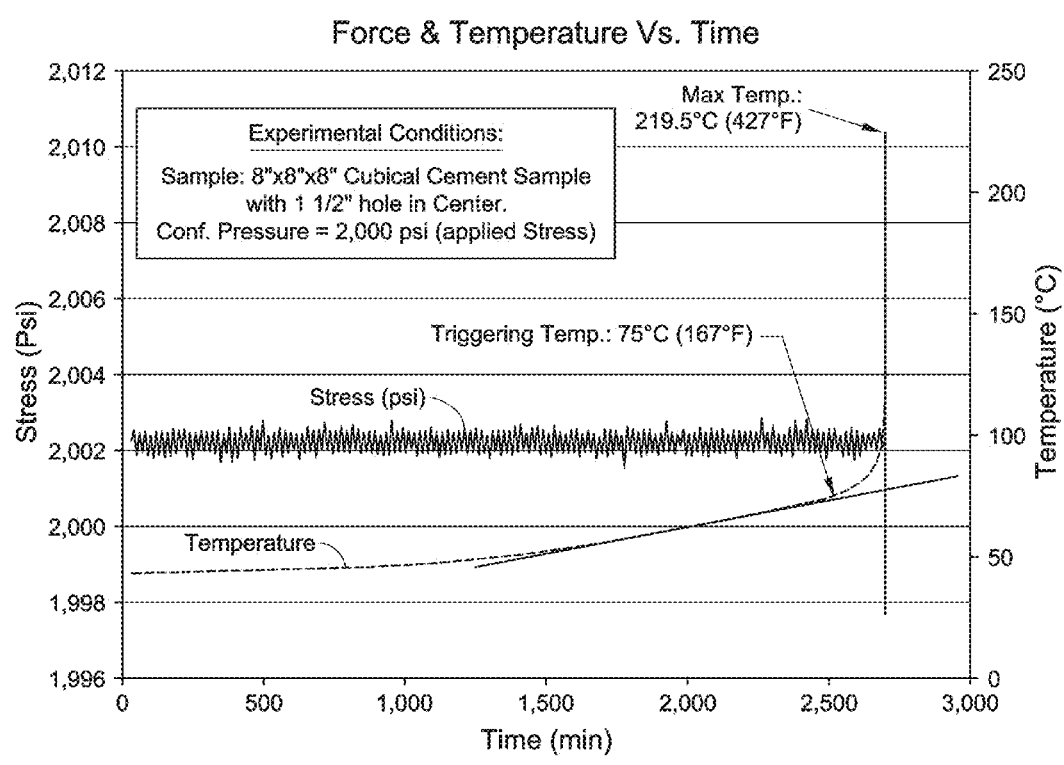
FIG. 11 is a graphic representation of the effect of the method of the present disclosure under 2,000 psi biaxial stress for confined test #5.
Figure 13:
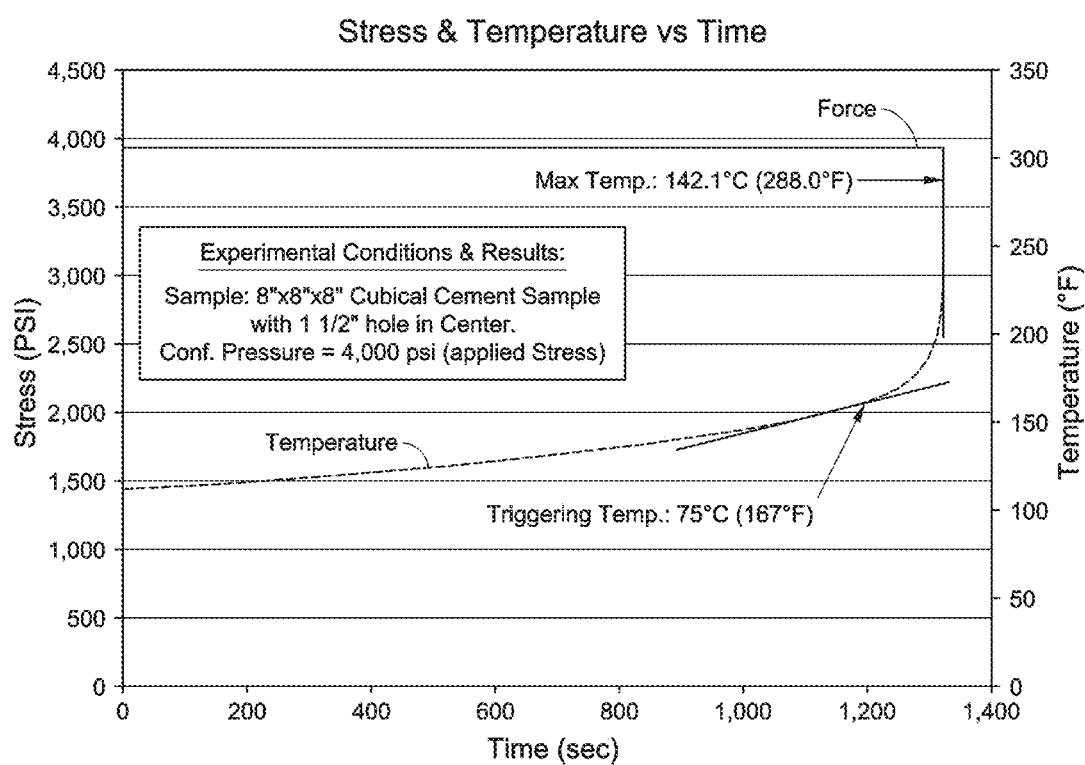
FIG. 13 is a graphic representation of the effect of the method of the present disclosure under 4,000 psi biaxial stress for confined test #6.
Figure 14:
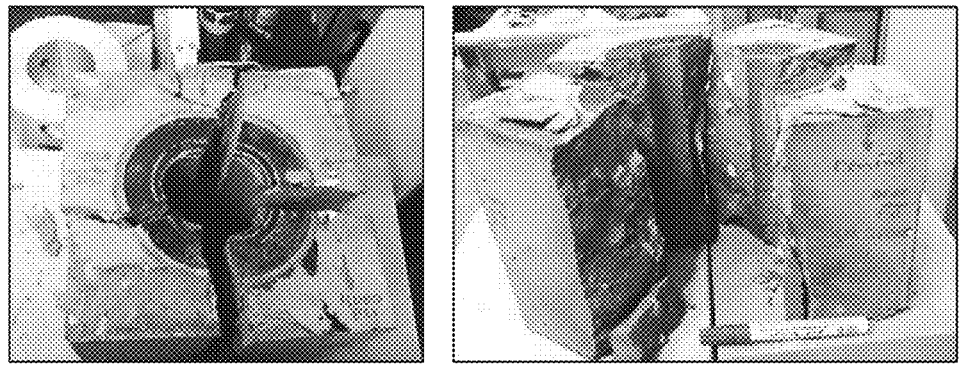
FIG. 14 is a pictorial representation of the cement rock sample after confined test #6.

The confined condition tests simulated in the center of an 8"×8"×8" cube, as shown in FIG. 10. The wellbore is 1.5 inches in diameter extending throughout the whole length of the sample, as shown in FIG. 5. The rock samples were then placed in a biaxial loading frame where two horizontal stresses of a given stress were applied while the vertical stress was controlled by mechanical tightening of the base and top plates. Then, the exothermic reaction component was injected in the rock sample at atmospheric pressure and room temperature at a rate of 15 cc/min. The rock sample was then heated for 2 to 3 hours until the reaction took place and fractures were created. Two tests were performed as follows:

In test 5, the applied horizontal stress was 2000 psi in both directions, as shown in FIG. 11. The reaction was triggered at 167° F. Upon triggering the reaction, three longitudinal fractures and one perpendicular fracture was created with respect to the vertical openhole wellbore, as shown in FIG. 12. The applied horizontal stress in test 6 was 4,000 psi in both directions, as shown in FIG. 13. The test results of test 6 exhibited almost the same behavior as test 5. Four longitudinal fractures were created with respect to the vertical openhole wellbore, as shown in FIG. 14. The fracture geometry shows that the fractures were longitudinal with respect to the vertical openhole wellbore. The fracture geometry indicates that two sets of fractures propagated from the vertical openhole wellbore to the end of the rock sample, indicating that the pressure generated was greater than 8000 psi. Each created planar fracture propagated in the direction of one of the horizontal stresses, σ (h), and perpendicular to the direction of the other a (h), as the applied stress is equal in both horizontal directions.

The confined tests confirm that the initial reservoir pressure does not diminish the pulse pressure and the ability of the pulse pressure to generate auxiliary fractures.

Example 5

Figure 15:
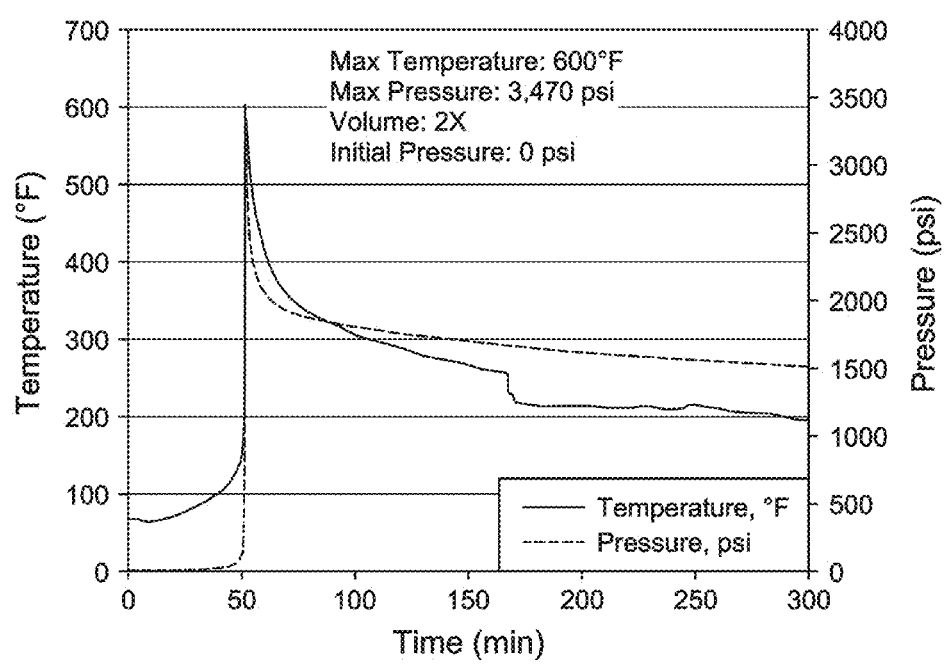
FIG. 15 is a graphic representation of the resultant temperature and pressure pulse due to the reaction of the exothermic reaction component at an initial pressure of zero psi and 200% solution volume.
Figure 16:
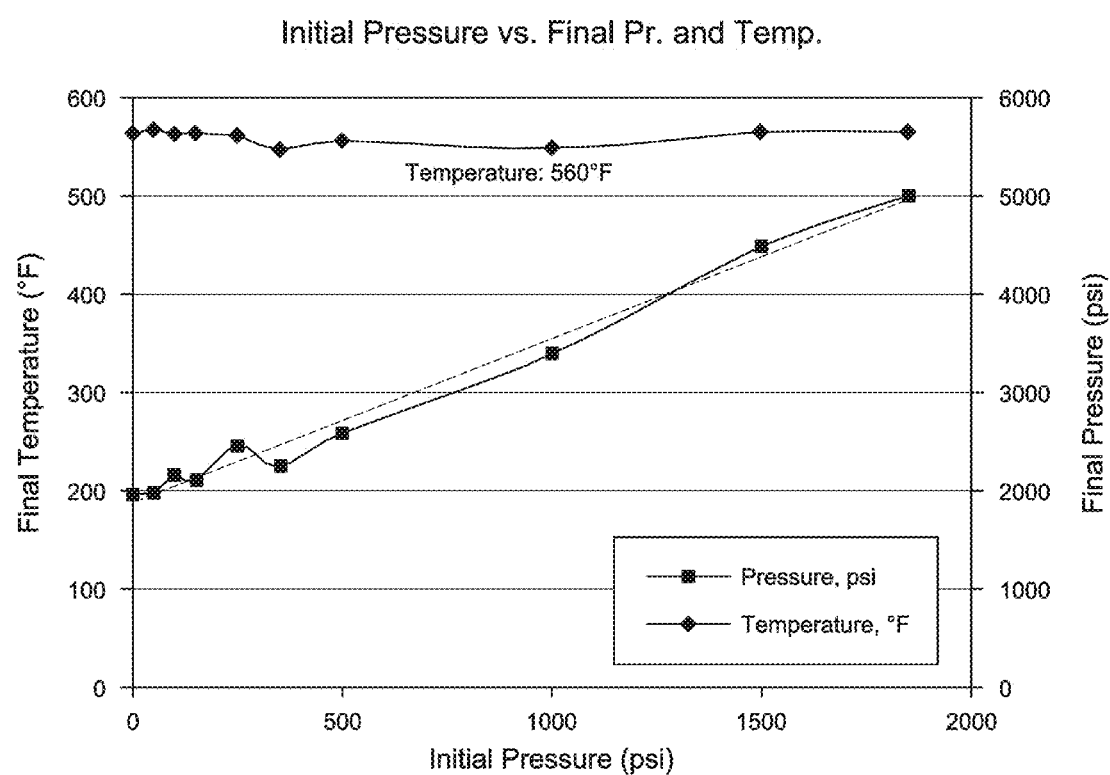
FIG. 16 is a comparison of the initial pressure to the resultant maximum temperature and maximum pressure of the pressure pulse due to the reaction of the exothermic reaction component.

An autoclave reactor, rated up to 10,000 psi was used to test the chemical reaction of the exothermic reaction component. FIG. 15 shows the reaction behavior with pressure pulse and temperature pulse. In the reactor test, the exothermic reaction component was placed in the autoclave at room temperature and pressure. Then, the temperature was increased until 120° F. was reached and the reaction was triggered. After the reaction was triggered, the pressure-rise time was less than 2 seconds, which was the low-limit of the autoclave reactor. The pressurizing rate affected the fractures generated in the rock sample. As shown in FIG. 16, the final pressure reached in the autoclave reactor is a function of the initial pressure in the autoclave reactor. In other words, Example 5 showed that the final pressure is the summation of the initial reactor pressure and the pressure generated by the reaction. However, the temperature was constant with the changes in initial pressure, at fixed chemical concentration and volume.

Figure 17:
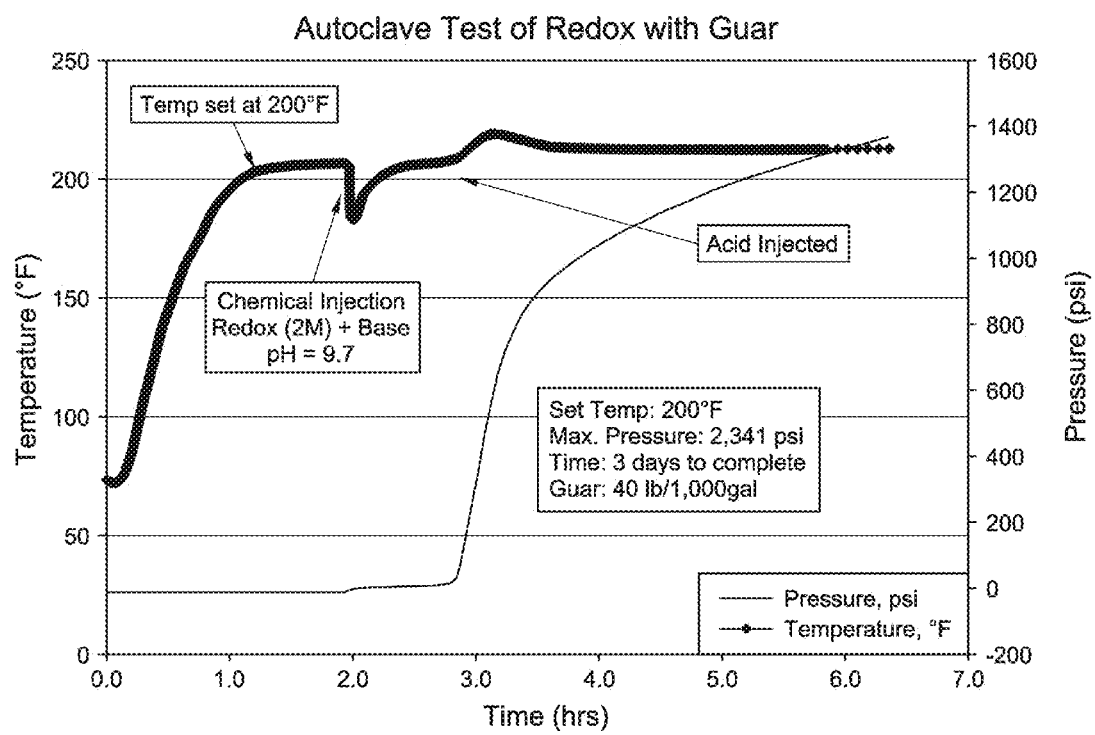
FIG. 17 is a graphic representation of the results from a test using a fracturing fluid prepared by mixing an exothermic reaction component and a viscous fluid component, where the reaction was triggered by adding a viscosity breaker to the fracturing fluid.

In another test, an exothermic reaction component was prepared with a viscous fluid component (40 lb/1000 gal) to create a fracturing fluid, FIG. 17. The solution pH of the fracturing fluid was adjusted until a pre-selected solution pH of 9.7 was achieved. This buffered the solution, preventing a reaction at the set temperature of the experiment. Then, the fracturing fluid was injected into the autoclave reactor, which was preset to a temperature of 200° F. The exothermic reaction component was not triggered until the pre-selected solution pH was reduced to a reaction-triggering pH. The solution pH was reduced to 5.7 pH after one hour by injecting a viscosity breaker, at which point the exothermic reaction component reacted.

In FIG. 17, the reaction of the exothermic reaction component generated a pressure pulse. The ability to control the start of the reaction of the exothermic reaction rate by adjusting the pH provides for control of the reaction behavior before, during, and after injections into the formation for field applications. In the Experiment shown by FIG. 17, the reaction was triggered by controlling the pH. Other conditions that can be controlled to trigger the exothermic reaction include temperature and solution concentrations.

Example 6

Figure 18:
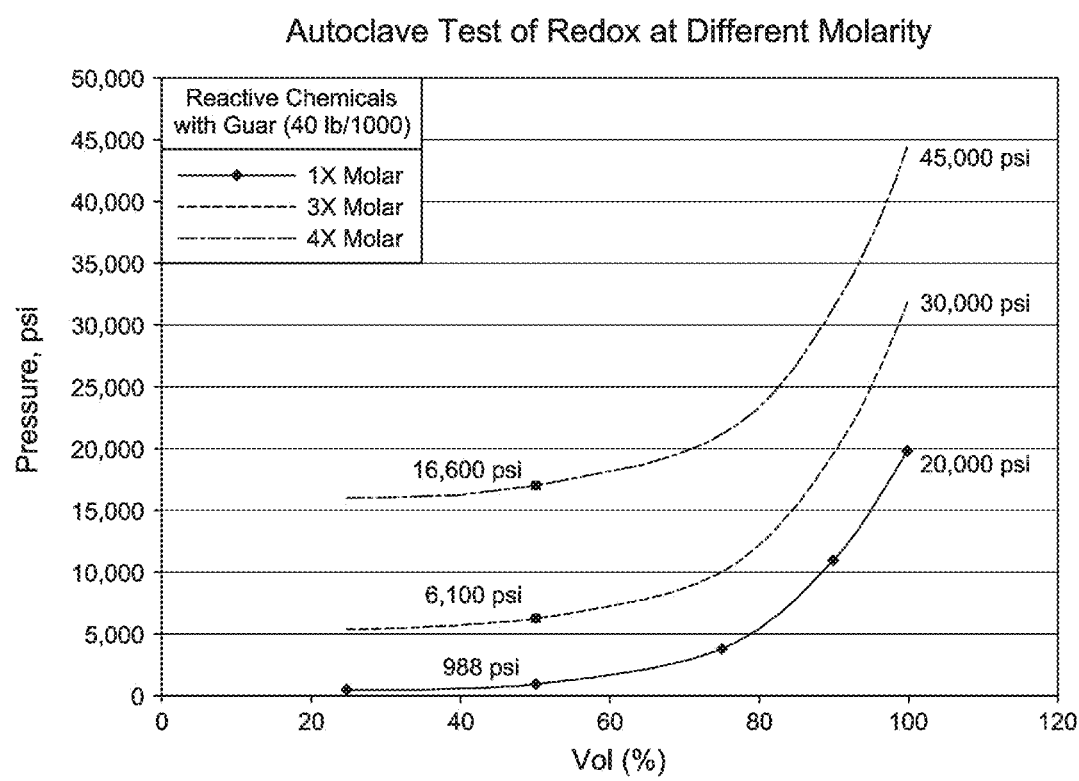
FIG. 18 is a graphic representation of the effect of the chemical concentration and solution volume on resultant pressure pulse.

The exothermic reaction component was tested using the autoclave reactor at different concentrations and solution volumes. The results showed that pressure is a function of concentration and solution volume. The greater the solution volume used, the greater the generated pressure, FIG. 18. Triggering of the exothermic reaction component causes a quick spike in pressure. Such a generation, spike, and subsidence of a pressure pulse can be seen in FIGS. 2, 11, 13, 15, and 17. At 50% solution volume, as concentration increased 1M, 3M, and 4M, pressure generated increased from 988 psi, to 6,100 psi, to 16,600 psi as measured using the autoclave reactor. Concentration was also shown to have an impact on generated pressure. At a 1M concentration solution, as the solution volume was increased from 50 to 100 vol %, the generated measured pressure increased from 988 psi to 20,000 psi. The test results suggest that pressure can reach greater than 45,000 psi at high concentrations and large volumes.

Example 7

Figure 19:
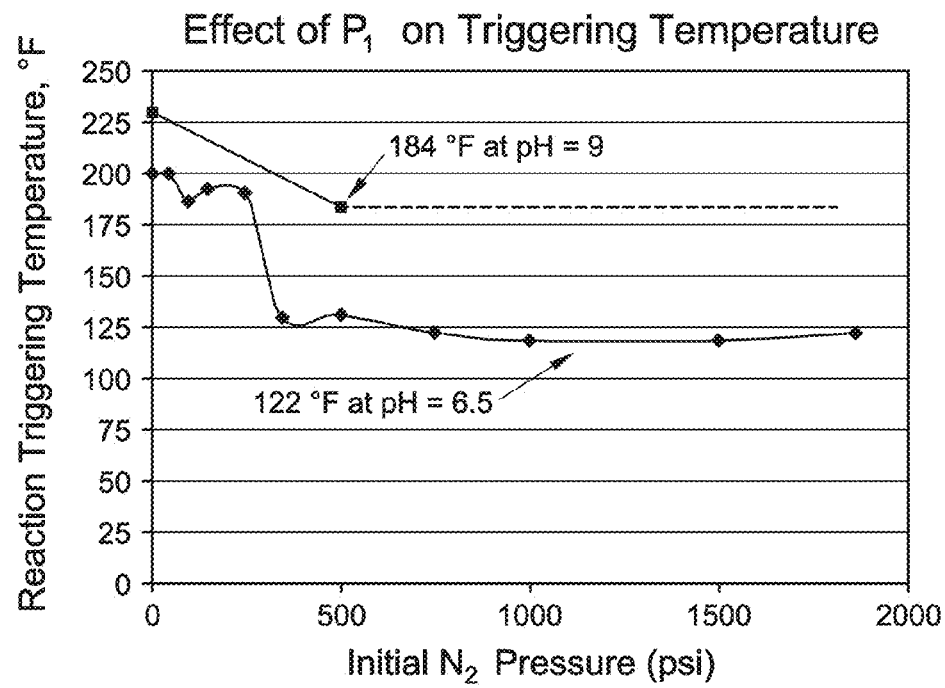
FIG. 19 is a graphic representation of the effect of initial pressure and pH on wellbore temperature at which a reaction of exothermic reaction component is triggered.

The wellbore temperature was simulated to be 200° F. at an initial reactor pressure of zero and a pre-selected solution pH of 6.5, as shown in FIG. 19. Once the wellbore temperature was reached, the reaction progressed very vigorously and the pressure pulse was generated in a millisecond. The minimum limit of the autoclave system was 2 seconds, so it was not possible to record the reaction pulse duration.

When the initial autoclave reactor pressure was 350 psi or higher, the wellbore temperature was stabilized around 122° F. When the solution pH was increased from 6 to 9, the wellbore temperature increased from 200 to 230° F., at zero initial pressure. At 500 psi initial pressure, the wellbore temperature was increased from 122 to 184° F., as the solution pH increased from 6.5 to 9.

In some embodiments, once the aqueous solution comprising the exothermic reaction component reaches the wellbore temperature, the time for the pressure pulse to occur, including the time for the pressure pulse to be generated, spike, and then generally subside, is less than 10 minutes, or less than 1 minute, or less than 30 seconds, or less than 10 seconds, or less than 5 seconds, or less than 2 seconds, or less than 1 second, or in about 1 millisecond. Such a generation, spike, and subsidence of a pressure pulse can be seen in FIGS. 2, 11, 13, 15, and 17.

In some embodiments, no viscous fluid component, such as, for example plant gum, is required to be used in combination with the exothermic reaction component(s). In some embodiments, the exothermic reaction creates a large amount of nitrogen gas quickly, which is produced to create pressure for the pressure pulse to create fractures in a hydrocarbon-bearing formation. In some embodiments, the pH of the exothermic reaction component aqueous solution is controlled to be above pH 4, or above pH 5, or above pH 6, or above pH 7, or above pH 8, or above pH 9, or at about pH 9.5.

Example 8

Figure 23:
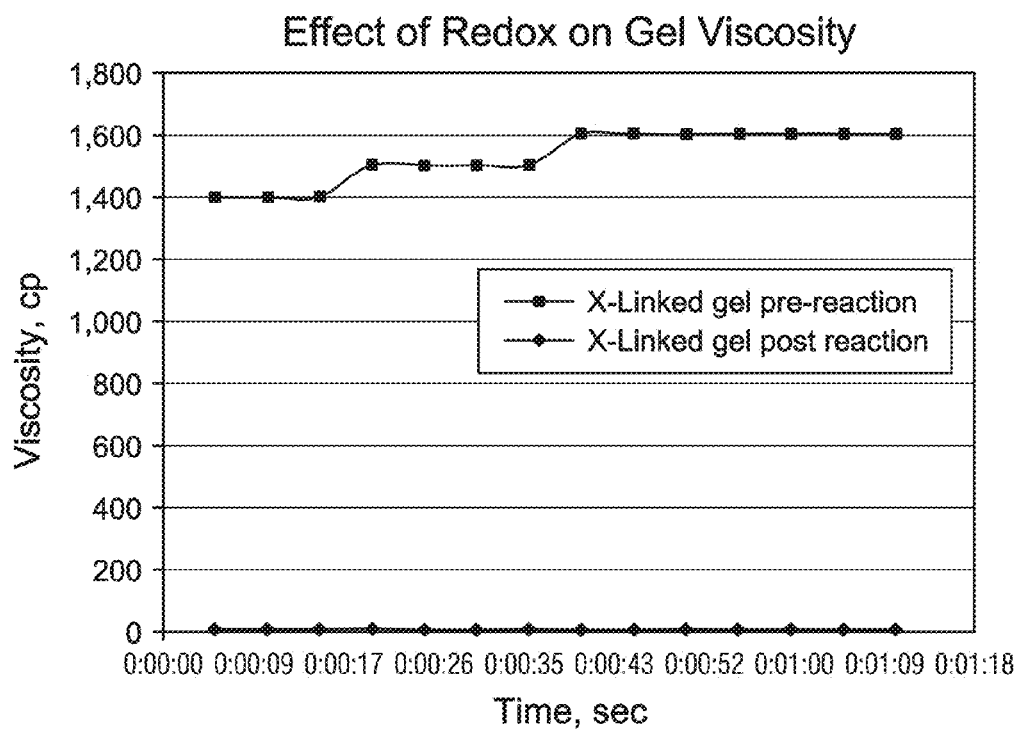
FIG. 23 is a graphic representation of the effect of reaction of the exothermic reaction component on the viscosity of the fracturing fluid.
Figure 20:
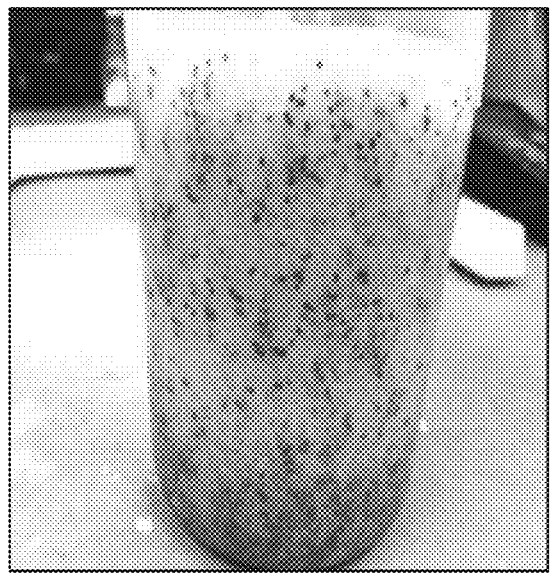
FIG. 20 is a pictorial representation of a mixture of the fracturing fluid including the viscous fluid component, the exothermic reaction component, and the proppant component.
Figure 21:
FIG. 21 is a pictorial representation of a mixture of the fracturing fluid including the viscous fluid component and the exothermic reaction component.
Figure 22:
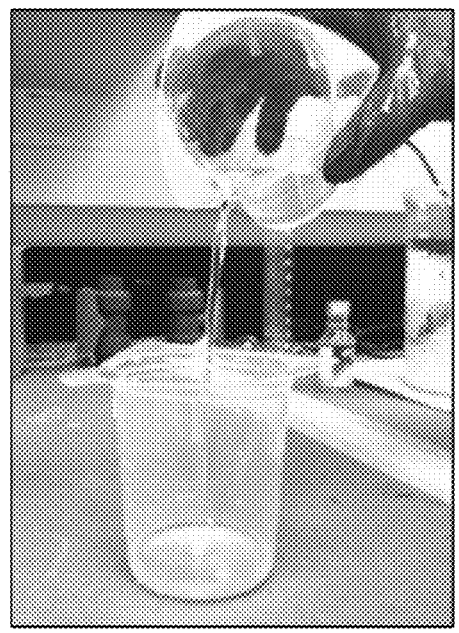
FIG. 22 is a pictorial representation of the fracturing fluid post-reaction of the exothermic reaction component.

The exothermic reaction component showed compatibility with the viscous fluid component (here an x-linked gel) as shown in FIG. 21. The fracturing fluid with the viscous fluid component, the exothermic reaction component, and the proppant component was also prepared and showed compatibility as shown in FIG. 20. The fracturing fluid, without the proppant component, was activated in the autoclave reactor by heating to the wellbore temperature to trigger the reaction of the exothermic reaction component. The heat generated by the reaction reduced the viscosity of the viscous fluid component to produce a reduced viscosity material, without injecting the viscosity breaker, as shown in FIG. 22. Using a chandler viscometer, the viscosity of the fracturing fluid, containing the viscous fluid component and the exothermic reaction component, was measured pre-reaction and post-reaction. The viscosity of the fracturing fluid was reduced from 1600 cp to 10 cp, as shown in FIG. 23. The results show that the exothermic reaction component and this type of treatment can clean-up the fractures post a fracturing job.

Example 9

Figure 24:
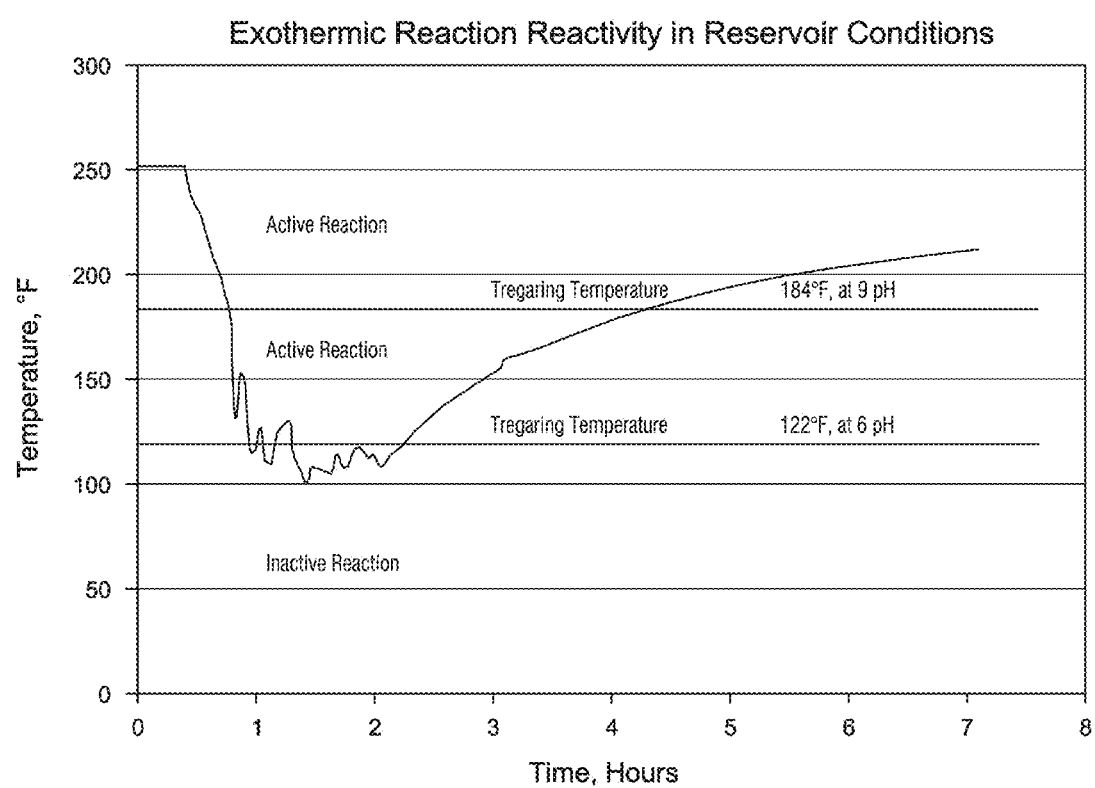
FIG. 24 is a graphic representation of the effect of reducing the wellbore temperature to delay reaction of exothermic reaction component.

A pre-flush was injected into the wellbore to reduce the wellbore temperature from 250° F. to 100° F., as seen in FIG. 24. Then, the fracturing fluid was injected into the well. The wellbore temperature was allowed to rise and the point at which the reaction was triggered by the wellbore temperature was recorded. As can be seen in FIG. 24, it took around three hours for the wellbore temperature to reach 184° F., which was the wellbore temperature necessary to trigger the exothermic reaction component when the pre-selected solution pH was 9. The heat recovery of the well triggers the reaction of the exothermic reaction component at different time frames, in this test between 1 to 3 hours. The results suggest that the exothermic reaction component and to some extent the conditions in the wellbore can be tailored to meet the needs of the process, including providing additional time to place the fracturing fluids with the exothermic reaction component in the wellbore and the fractures.

Referring now to FIGS. 25-34, microscopic analysis of a sample treated by the reactive exothermic components of the present disclosure showed that no damaged zone is formed around the treated area; however, a synthetic sweetspot is created. A tight core sample with an air permeability of 0.005 nanoDarcy was chemically treated using a core flood system. The exothermic reaction component was injected through a drilled hole within the core sample at ⅔ of the total core sample length of 3.2 inches. The core diameter was 1.5 inches with porosity of 1.35%.

Figure 27:
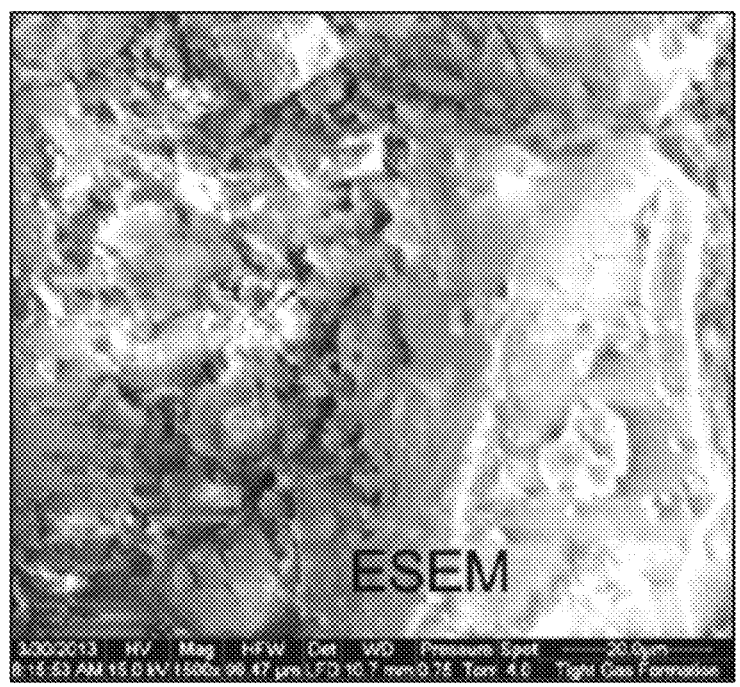
FIGS. 27-28 are Environmental Scanning Electron Microscope (ESEM) images of a tight core sample before the application of an exothermic reaction component to the core sample.
Figure 28:
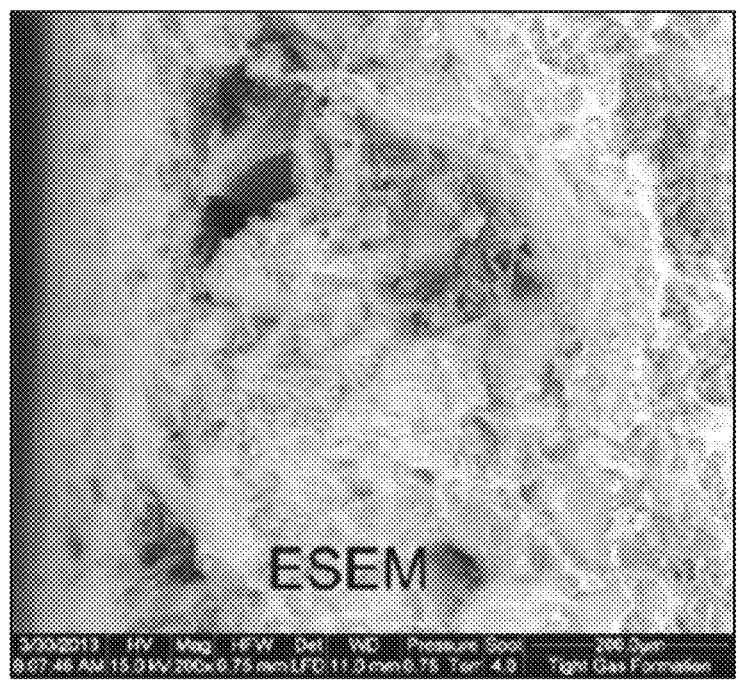
Figure 29:
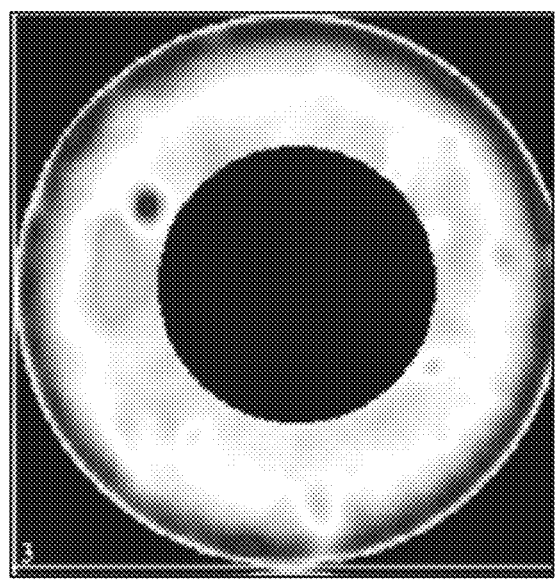
FIG. 29 is a MR-CT-scan analysis (nuclear magnetic resonance combined with X-ray computed tomography for core analysis) of a tight core sample before the application of an exothermic reaction component to the core sample.
Figure 31:
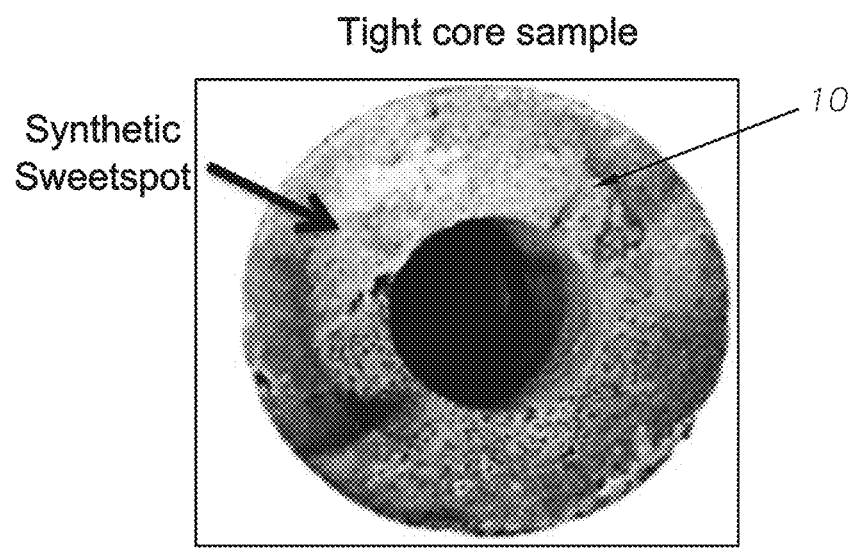
FIG. 31 is a pictorial representation of a tight core sample after the application of an exothermic reaction component to the core sample.
Figure 32:
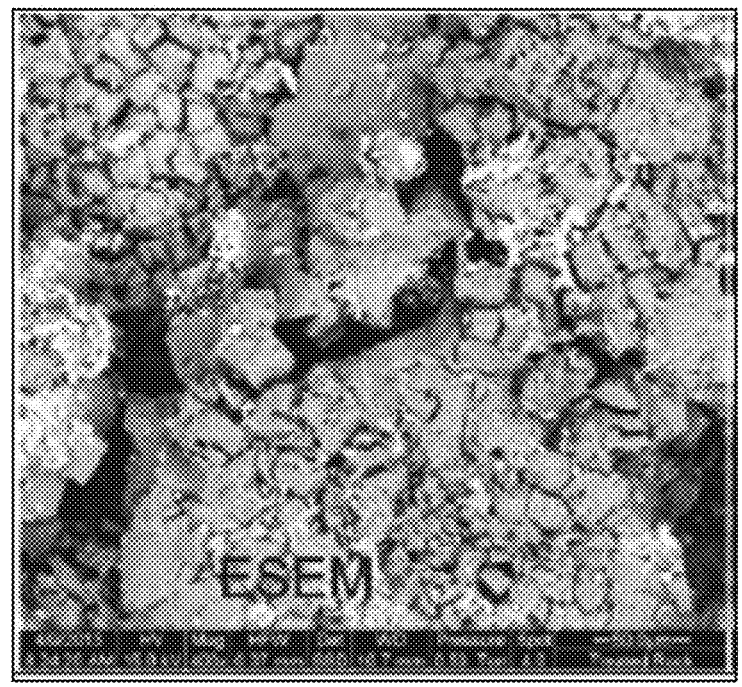
FIGS. 32-33 are ESEM images of a tight core sample after the application of an exothermic reaction component to the core sample.
Figure 33:
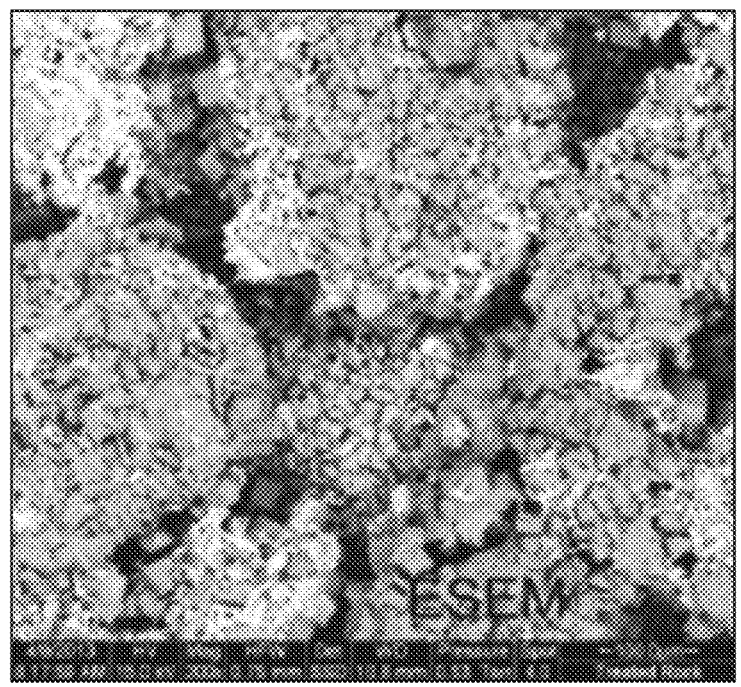
Figure 34:
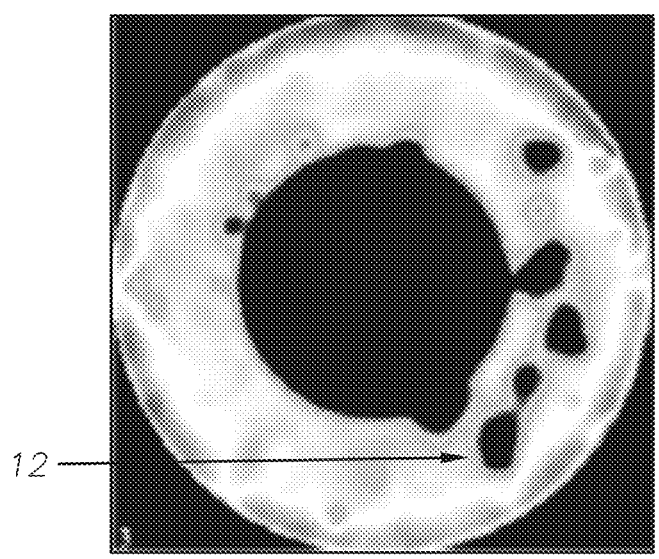
FIG. 34 is a MR-CT-scan analysis of a tight core sample after the application of an exothermic reaction component to the core sample.

Pre and post treatment MR-CT-scan analysis (nuclear magnetic resonance combined with X-ray computed tomography for core analysis), shown in FIGS. 29 and 34, respectively, shows significant density reduction. As shown, voids are scattered around the treated area throughout the core sample in FIG. 34. The change from FIG. 29 to FIG. 34 reflects an increase in porosity in the sample around the treated area. Environmental Scanning Electron Microscope (ESEM) analysis was also performed before and after treatment by the exothermic reaction component. FIGS. 27 and 28 show ESEM images of the sample taken before treatment with the exothermic reaction component, and FIGS. 32 and 33 show ESEM images of the sample taken after treatment with the exothermic reaction component. Several backscattered electron topographical images were taken at different magnifications from different parts of the samples, but mainly from the center of the rock samples. The ESEM images show that microfractures were created along the core sample by the exothermic reaction component. The ESEM images also show submicron pores and micro-cracks.

Figure 25:
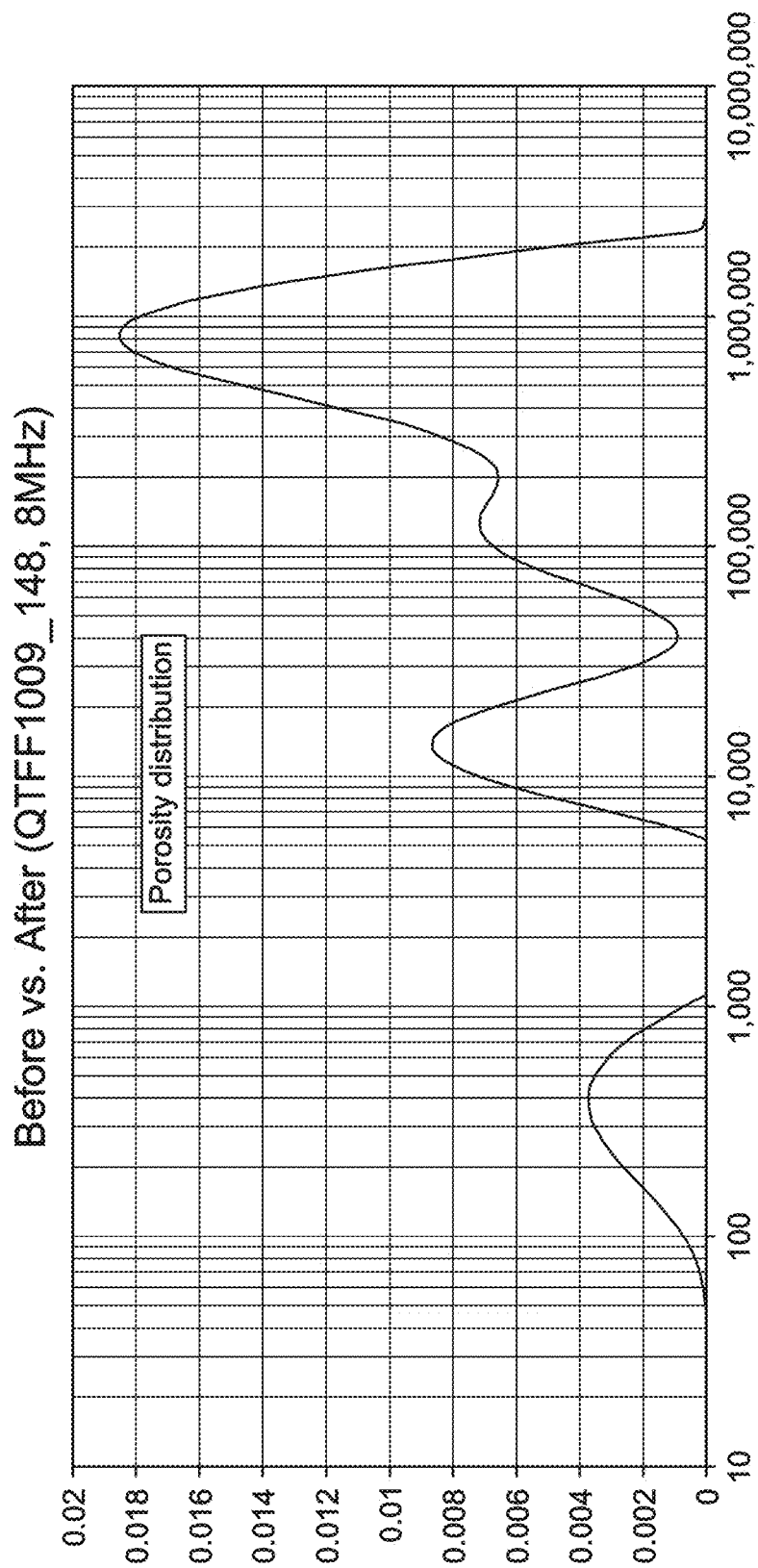
FIG. 25 is a graphic representation of the porosity distribution in a tight core sample before the application of an exothermic reaction component to the core sample.
Figure 30:
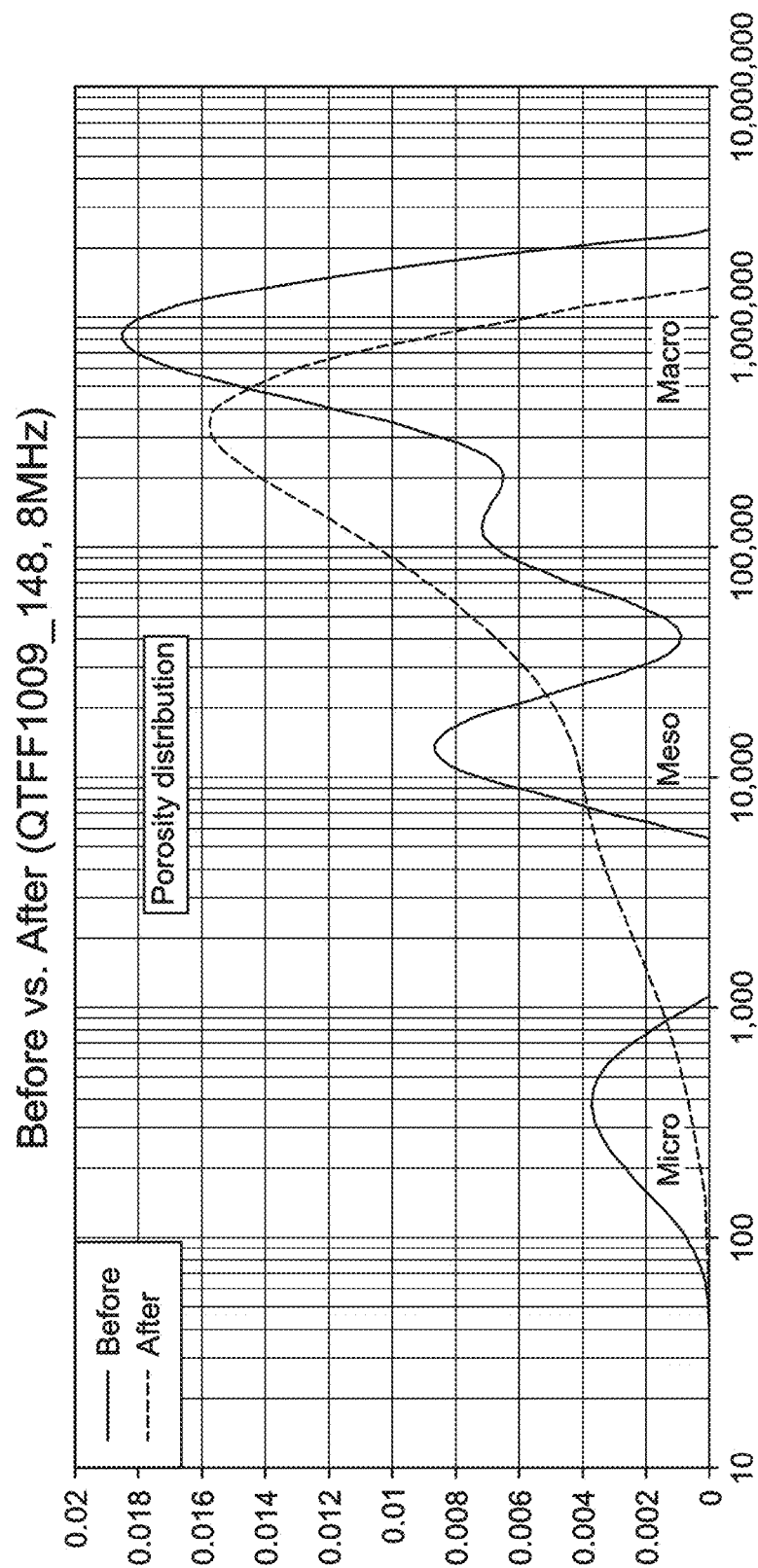
FIG. 30 is a graphic representation of the porosity distribution in a tight core sample before and after the application of an exothermic reaction component to the core sample.

The sizes of the pores were measured and found to be in a range of less than about 1 micron to about 50 microns. The concentration of the cracks and pores were mainly in the center of the rock, where the epicenter of the treatment took place. The exothermic reaction treatment has led to the initiation of micro-cracks and pores in the rock samples. The post exothermic reaction treatment MR-CT scan image of FIG. 34 shows a significant increase in macro pores throughout the core and suggests a communication of an otherwise isolated system of micro, meso, and macro pores of the core with an overall permeability increase. FIG. 25 shows the isolated porosity system of the core sample pretreatment, in which micro, meso, and macro pores are clearly not communicating to each other. However, post exothermic reaction component treatment results shown in FIG. 30 show a strong communication between all pore sizes and an overall permeability increase.

Figure 26:
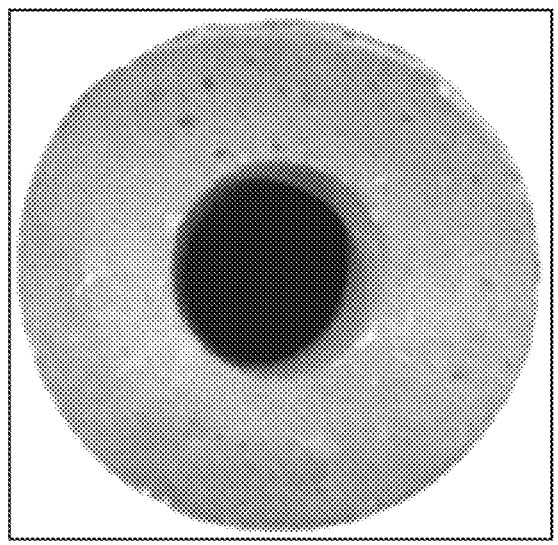
FIG. 26 is a pictorial representation of a tight core sample before the application of an exothermic reaction component to the core sample.

The pre and post MR-CT scans shown in FIGS. 29 and 34 respectively show significant porosity increase and created fractures due to the exothermic chemical reaction brought about by the exothermic reaction component. FIG. 29 represents a high density, low porosity sample before treatment by the exothermic reaction component, while the dark regions 12 in FIG. 34 represent low density and high porosity regions brought about by the exothermic reaction component. FIG. 31 shows a tight core sample after treatment by the exothermic reaction component, and shows creation of fractures 10 perpendicular to the flow of injection, which are not present before treatment (FIG. 26). Clear reduction of density and porosity is noted. Fractures and voids are clearly shown in the samples.

Although the present disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method of increasing a stimulated reservoir volume in a wellbore in a gas-containing formation, the method comprising the steps of:
   mixing an exothermic reaction component in an aqueous solution to achieve a pre-selected solution pH, wherein the exothermic reaction component is operable to react at a pre-selected wellbore temperature to generate a pressure pulse;
   mixing the aqueous solution with a viscous fluid component to form a fracturing fluid, the viscous fluid component operable to fracture the gas-containing formation to create fractures, and the fracturing fluid further comprising a proppant component, the proppant component carried to the fractures by the viscous fluid component, the proppant component comprises a proppant, the proppant operable to hold open the fractures;
   injecting the fracturing fluid into the wellbore in the gas-containing formation to create fractures; and
   after injecting the fracturing fluid into the wellbore, generating the pressure pulse with an unreacted amount of exothermic reaction component in situ, the unreacted amount of exothermic reaction component in situ sufficient for the pressure pulse to be between about 500 psi and about 50,000 psi, when the exothermic reaction component reaches the pre-selected wellbore temperature, such that the pressure pulse is operable to create auxiliary fractures by released pressure without the viscous fluid component and the proppant component, wherein the auxiliary fractures create a fracture network, wherein the fracture network increases the stimulated reservoir volume.

2. The method of claim 1, wherein the exothermic reaction component comprises an ammonium containing compound and a nitrite containing compound.

3. The method of claim 2, wherein the ammonium containing compound comprises $NH_4Cl$ and the nitrite containing compound comprises $NaNO_2$.

4. The method of claim 1, wherein the pre-selected solution pH is between 5.7 and 9.

5. The method of claim 1, wherein the wellbore temperature is in a range between 48.8° C. (120° F.) and 121.1° C. (250° F.).

6. The method of claim 1, wherein the pressure pulse creates the auxiliary fractures in less than 10 seconds.

7. The method of claim 1, wherein the pressure pulse creates the auxiliary fractures in less than 5 seconds.

8. A method of increasing a stimulated reservoir volume in a wellbore in a gas-containing formation that has fractures, the method comprising the steps of:
   mixing an exothermic reaction component in an aqueous solution to achieve a pre-selected solution pH, wherein the exothermic reaction component is operable to react at a pre-selected wellbore temperature to generate a pressure pulse in the absence of a viscous fluid component and proppant component;
   injecting the solution into the gas-containing formation; and
   generating the pressure pulse when the exothermic reaction component reaches the pre-selected wellbore temperature, such that the pressure pulse is operable to create auxiliary fractures, wherein the auxiliary fractures create a fracture network, wherein the fracture network increases the stimulated reservoir volume.

9. The method of claim 1, wherein the method generates substantially no foam.

10. The method of claim 8, wherein the exothermic reaction component comprises an ammonium containing compound and a nitrite containing compound.

11. The method of claim 10, wherein the ammonium containing compound comprises $NH_4Cl$ and the nitrite containing compound comprises $NaNO_2$.

12. The method of claim 8, wherein the pre-selected solution pH is between 5.7 and 9.

13. The method of claim 8, wherein the wellbore temperature is in a range between 48.8° C. (120° F.) and 121.1° C. (250° F.).

14. The method of claim 8, wherein the pressure pulse is between 500 psi and 50,000 psi.

15. The method of claim 8, wherein the pressure pulse creates the auxiliary fractures in less than 10 seconds.

16. The method of claim 8, wherein the pressure pulse creates the auxiliary fractures in less than 5 seconds.

17. The method of claim 8, wherein the method generates substantially no foam.

18. A method for hydraulic fracturing of a hydrocarbon-bearing formation, the method comprising the steps of:
   determining a wellbore temperature at a depth within the hydrocarbon-bearing formation;
   determining a length of time for which a hydraulic fracturing fluid needs to reach the depth within the hydrocarbon-bearing formation and reach the wellbore temperature at the depth;
   mixing an exothermic reaction component in an aqueous solution to achieve a pre-selected solution pH, wherein the exothermic reaction component is operable to react at the wellbore temperature at the depth within the hydrocarbon-bearing formation to generate a pressure pulse;

mixing the aqueous solution with a viscous fluid component to form the hydraulic fracturing fluid, the viscous fluid component operable to fracture the hydrocarbon-bearing formation to create fractures, and the fracturing fluid further comprising a proppant component, the proppant component carried to the fractures by the viscous fluid component, the proppant component comprises a proppant, the proppant operable to hold open the fractures;

injecting the fracturing fluid into the wellbore in the hydrocarbon-bearing formation to create fractures; and generating the pressure pulse when the exothermic reaction component reaches the wellbore temperature, such that the pressure pulse is operable to create auxiliary fractures, wherein the auxiliary fractures create a fracture network, wherein the fracture network increases the stimulated reservoir volume, and the exothermic reaction component compatible with the viscous fluid component and operable to reduce a viscosity of the viscous fluid component.

19. The method of claim 18, wherein the exothermic reaction component comprises an ammonium containing compound and a nitrite containing compound.

20. The method of claim 19, wherein the ammonium containing compound comprises $NH_4Cl$ and the nitrite containing compound comprises $NaNO_2$.

21. The method of claim 18, wherein the pre-selected solution pH is between 5.7 and 9.

22. The method of claim 18, wherein the wellbore temperature is in a range between 48.8° C. (120° F.) and 121.1° C. (250° F.).

23. The method of claim 18, wherein the pressure pulse is between 500 psi and 50,000 psi.

24. The method of claim 18, wherein the pressure pulse creates the auxiliary fractures in less than 10 seconds.

25. The method of claim 18, wherein the pressure pulse creates the auxiliary fractures in less than 5 seconds.

26. The method of claim 18, wherein the method generates substantially no foam.

* * * * *